United States Patent [19]

Kakogawa et al.

[11] 4,229,558

[45] Oct. 21, 1980

[54] PROCESS FOR PREPARING POLYOLEFIN

[75] Inventors: Genjiro Kakogawa; Masayoshi Hasuo; Yoshinori Suga, all of Yokohama; Hisashi Kitada, Tokyo, all of Japan

[73] Assignee: Mitsubishi Chemical Industries Limited, Tokyo, Japan

[21] Appl. No.: 71,388

[22] Filed: Aug. 30, 1979

Related U.S. Application Data

[63] Continuation of Ser. No. 855,683, Nov. 29, 1977, abandoned.

[30] Foreign Application Priority Data

Dec. 13, 1976 [JP] Japan .................. 51-149529

[51] Int. Cl.$^2$ .................. C08F 4/02; C08F 10/06
[52] U.S. Cl. .................. 526/125; 252/429 B; 252/429 C; 526/127; 526/128; 526/138; 526/142
[58] Field of Search .................. 526/124, 125, 138

[56] References Cited

U.S. PATENT DOCUMENTS

| 4,069,169 | 1/1978 | Toyota et al. | 526/125 |
| 4,071,672 | 1/1978 | Kashiwa | 526/125 |
| 4,076,924 | 2/1978 | Toyota et al. | 526/125 |

FOREIGN PATENT DOCUMENTS

| 49-119982 | 11/1974 | Japan . | |
| 50-44273 | 4/1975 | Japan | 526/124 |
| 1235062 | 6/1971 | United Kingdom | 526/142 |
| 1275641 | 5/1972 | United Kingdom | 526/124 |
| 1299862 | 12/1972 | United Kingdom | 526/151 |

*Primary Examiner*—Edward J. Smith
*Attorney, Agent, or Firm*—Oblon, Fisher, Spivak, McClelland & Maier

[57] ABSTRACT

In a process for preparing polyolefin by polymerizing an olefin in the presence of a catalyst system combining an organoaluminum compound and a titanium-containing solid catalytic component prepared by mixing (a) water and/or a hydroxy compound, (b) a Grignard reagent and (c) a titanium tetrahalide, the components (a) (b) or (c) or the reaction mixture of two or three components thereof is contacted with (d) one or more electron donor selected from the group consisting of amines, carboxylic acid amides, phosphines, phosphine oxides, phosphoric esters, phosphorous esters, phosphoric acid amides, ketones and carboxylic esters. The polyolefin having high isotactic index can be obtained.

7 Claims, No Drawings

PROCESS FOR PREPARING POLYOLEFIN

This is a continuation, of application Ser. No. 855,683, filed Nov. 29, 1977, now abandoned.

BACKGROUND OF THE INVENTION

1. Field of the Invention

The present invention relates to a process for preparing a polyolefin. More particularly, it relates to a process for preparing a polyolefin by polymerizing an olefin such as ethylene, propylene, butene-1 etc., in the presence of a catalyst having high catalytic activity comprising an organoaluminum compound and a carrier supported catalytic component.

2. Description of the Prior Art

Heretofore, it has been proposed to use various carrier supported catalytic component for a polymerization of an olefin. For example, it has been proposed for the polymerization of α-olefins to use a solid catalytic component prepared by reacting a titanium halide on a carrier of divalent metal hydroxychloride prepared by using a dibalent metal chloride and an oxide or a hydroxide in Japanese Patent Publication Nos. 13050/1968 and 5547/1969.

However, when these catalysts are used, the stereospecific properties of the resulting polymers prepared by polymerizing an olefin especially propylene or butene-1, are remarkably low and the industrial value is not enough high.

SUMMARY OF THE INVENTION

It is an object of the present invention to provide a process for preparing a polyolefin having high stereospecific properties by using a catalyst having high catalytic activity.

It is another object of the present invention to provide a process for preparing a polyolefin having high isotactic index which can be used without separating a catalyst residue because of high activity of the catalyst.

The foregoing and other objects of the present invention have been attained by providing a process for preparing a polyolefin by polymerizing an olefin in the presence of a catalytic system combining an organoaluminum compound and a titanium-containing solid catalytic component prepared by mixing (a) water and/or a hydroxy compound, (b) a Grignard reagent (c) a titanium tetrahalide and (d) one or more electron donor selected from the group consisting of amines, carboxylic acid amides, phosphines, phosphine oxides, phosphoric esters, phosphorous esters, phosphoric acid amides, ketones and carboxylic esters, in suitable order.

DETAILED DESCRIPTION OF THE PREFERRED EMBODIMENTS

The titanium-containing solid catalytic components used in the process of the present invention can be prepared by contacting (a) water and/or a hydroxy compound (hereinafter referring to as OH compound),
(b) a Grignard reagent,
(c) a titanium tetrahalide and
(d) a specific electron donor.

These components used in the preparation will be illustrated.

(a) OH compound:

Water can be used in a liquid form by itself. Thus, it is preferable to use water by dissolving water in an ether solvent such as diethyl ether, dibutyl ether and tetrahydrofuran. Water can be also used in a form of steam. In this case, steam can be diluted with an inert gas such as nitrogen and argon.

The hydroxy compounds have the formula $$R(OH)_n$$

wherein n represents an integer of 1–6 and R represents a hydrocarbon moiety, preferably a hydrocarbon moiety having 1–35 of carbon atoms or the formula $$\text{+CH}_2CZ_2O\text{]}_l H$$

wherein Z represents a hydrogen atom or a alkyl group having 1–6 of carbon atoms and l represents an integer of 1–30.

Suitable hydroxy compounds include monohydric alcohols, polyhydric alcohols and phenols.

Monohydric alcohols include alkyl alcohols such as methyl alcohol, ethyl alcohol, propyl alcohol, butyl alcohol, amyl alcohol, octyl alcohol, 2-ethylhexyl alcohol, nonyl alcohol and decyl alcohol; aralkyl alcohols such as benzyl alcohol; alicyclic alcohols such as cyclohexyl alcohol; etc.

Polyhydric alcohols include alkylene glycols such as ethylene glycol, propylene glycol and butylene glycol; polyalkylene glycols such as polyethylene glycol and polypropylene glycol; glycerol; pentaerythritol; etc. Phenols include phenol, cresol, catecol, resorcinol, etc.

Bisides the compound represented above-formula of $R(OH)_n$, hydroxy-containing hydrocarbon polymers whose molecular weight is more than 500 can be used as the hydroxy compound, such as polyvinyl alcohol, hydrolysed ethylene-vinylacetate copolymers, etc.

The compound can be used with or with or without diluting with a diluent.

Suitable diluents include aromatic hydrocarbons such as benzene and toluene; saturated aliphatic hydrocarbons such as n-heptane, n-hexane, alicyclic hydrocarbons such as cyclohexane, methyl cyclohexane; and ethers such as diethyl ether and dibutyl ether.

It is preferable to use water, monohydric alcohols and phenols, especially water and alkyl alcohols.

(b) Grignard reagents:

The Grignard reagents have the formula $$R^1 MgX$$

wherein $R^1$ represents a hydrocarbon moiety and X represents a halogen atom.

Suitable hydrocarbon moiety $R^1$ include alkyl, aryl and aralkyl groups which have up to 20, preferably up to 10, of carbon atoms, especially alkyl groups such as methyl, ethyl, propyl, butyl, amyl and hexyl groups; aryl groups such as phenyl; and aralkyl groups such as benzyl group. Suitable halogen atoms X include chlorine, bromine and iodine atoms.

The Grignard reagent is usually used in a form of an ether solution or an ether adduct. Suitable ethers include diethyl ether, dibutyl ether, dihexyl ether, dioctyl ether, tetrahydrofuran, tetrahydropyran, dioxane, diethyl thioether, etc.

Suitable solvents beside the ether solvents include aromatic hydrocarbons such as benzene and toluene; heterocyclic compounds such as pyridine and thiophene.

(c) Titanium tetrahalides:

The titanium tetrahalides include titanium tetrachloride, tetrabromide, tetraiodide, etc. and it is preferable to use titanium tetrachloride.

(d) Electron donors:

Suitable electron donors include amines, carboxylic acid amides, phosphines, phosphine oxides, phosphoric esters, phosphorous esters, phosphoric acid amides, ketones, and carboxylic esters. One or more electron donors can be used.

The carboxylic esters have a hydrocarbon moiety which can have a substituent of an amino group or an alkoxy group such as amino acid esters.

Suitable electron donors include amines such as tetramethyl ethylenediamine, tetraethyl ethylenediamine, etc.; carboxylic acid amides such as benzoic acid amide, acetamide, etc.; phosphines such as tris (nonylphenyl) phosphine, triphenyl phosphine, etc.; phosphine oxides such as triethylphosphine oxide, triphenylphosphine oxide, etc.; phosphoric esters such as triethyl phosphate, tributyl phosphate, etc.; phosphorous esters such as triphenyl phosphite, tris (nonylphenyl) phosphite, etc.; phosphoric acid amides such as hexamethyl phosphoric acid tri-amide etc.; and carboxylic esters such as methyl benzoate, ethyl benzoate, propyl benzoate, butyl benzoate, phenyl benzoate, methyl p-methoxybenzoate, ethyl p-methoxybenzoate, propyl p-methoxybenzoate, methyl p-methylbenzoate, ethyl p-methylbenzoate, butyl m-methoxybenzoate, phenyl o-methoxybenzoate, methyl p-ethoxybenzoate, ethyl p-ethoxybenzoate, butyl p-methoxybenzoate, methyl p-ethylbenzoate, ethyl p-ethylbenzoate, butyl-p-ethoxybenzoate, methyl p-butoxybenzoate, ethyl p-butoxybenzoate, butyl p-butoxybenzoate, phenyl acetate, phenyl propionate, ethyl acrylate, methyl methacrylate, ethyl crotonate, propyl crotonate, butyl crotonate, ethyl cinnamate, propyl cinnamate, butyl cinnamate, dimethylglycine ethyl ester, dimethylglycine propyl ester, dimethylglycine butyl ester, diphenylglycine ethyl ester, diphenylglycine propyl ether, diphenylglycine butyl ester, ethyl p-dimethyl aminobenzoate, etc., ketones such as acetone, methyl ethyl ketone, benzophenone, acetophenone etc.

It is preferable to use carboxylic esters especially ethyl benzoate, methyl p-methylbenzoate, ethyl p-methylbenzoate.

The electron donors can be used in a pure form and also by diluting with a diluent.

Suitable diluents include aromatic hydrocarbons such as benzene and toluene; saturated aliphatic hydrocarbons such as n-pentane, n-hexane, n-heptane, n-octane, n-dodecane and liquid paraffin; alicyclic hydrocarbons such as cyclohexane and methyl cyclohexane; and ethers such as diethyl ether, dibutyl ether, tetrahydrofuran and tetrahydropyran.

In the process of the present invention, the four components (a), (b), (c) and (d) are contacted in suitable order to obtain the titanium-containing solid component.

The titanium tetrahalide as (c) component is preferably used in the condition that the titanium tetrahalide (c) is added to the reaction mixture produced by reacting the OH compound (a) with the Grignard reagent (b) or the reaction mixture produced by reacting the OH compound (a) with the Grignard reagent (b) and the electron donor (d).

Thus, it is preferable to contact the OH compound (a) with the Grignard reagent (b) before contacting them with the titanium tetrahalide (c).

The electron donor (d) is preferably used in the condition that the electron donor (d) is added to the reaction mixture produced by reacting the OH compound (a) with the Grignard reagent (b) or the reaction mixture produced by reacting the OH compound (a) with the Grignard reagent (b) and the titanium tetrahalide (c).

The typical examples contacting the components (a), (b), (c) and (d) are as follows:

(1) The OH compound (a) is contacted with the Grignard reagent (b) to react them in the presence of the electron donor (d) and then, the titanium tetrahalide (c) is added to the reaction mixture.

(2) The OH compound (a) is contacted with the Grignard reagnet (b) to react them and the electron donor (d) is added and then the titanium tetrahalide (c) is added to the reaction mixture.

(3) The OH compound (a) is contacted with the Grignard reagent (b) to react them and the titanium tetrahalide (c) is added to the reaction mixture and then the electron donor (d) is added to it.

(4) The product obtained by contacting the OH compound (a) with the Grignard reagent (b) is simultaneously treated with the titanium tetrahalide (c) and the electron donor (d). The method (2) and (4) are preferable.

When the product obtained by reacting the OH compound (a) with the Grignard reagent (b) is compound having the formula $$Mg(OR^8)X.nE$$

wherein $R^8$ represents hydrogen atom or a hydrocarbon moiety; X represents a halogen atom; E represents an ether and n represents 0.4 to 25, in the methods (1) to (4), the catalyst having higher catalytic activity can be obtained.

In the formula, $R^8$ represents hydrogen atom or hydrocarbon moiety having up to 20 of carbon atoms such as alkyl groups e.g. methyl, ethyl, propyl, butyl, amyl, hexyl, octyl, nonyl and decyl groups; aryl group e.g. phenyl; and aralkyl groups e.g. benzyl group; X represents Cl, Br and I, especially Cl; E represents an ether, polyether, glycol ether or dioxane having the formula $R^2$—O—$R^3$ wherein $R^2$ and $R^3$ respectively represent hydrocarbon moiety having 1 to 30 of carbon atoms and $R^2$ and $R^3$ can be bonded each other to form a ring such as dialkyl ethers e.g. diethyl ether, di-n-butyl ether, di-i-propyl ether, di-n-butyl ether, di-i-butyl ether, di-t-butyl ether, di-n-amyl ether, di-i-amyl ether, di-n-hexyl ether and di-n-octyl ether; diaryl ethers e.g. diphenyl ether and dibenzyl ether; diaralkyl ethers; alkylaryl ethers, e.g. phenetole and anisole; alkyl cycloalkyl ethers, e.g. methyl cyclohexyl ether, alkyl aralkyl ethers e.g. methyl benzyl ether; polyethers e.g. polyethyleneglycol alkyl ether, polypropyleneglycol alkyl ether, polyethyleneoxide and polypropyleneoxide; glycol ethers, e.g. ethyleneglycol dimethyl ether and ethyleneglycol diethyl ether; propyleneoxide; cyclic ethers e.g. tetrahydrofuran, dioxane, 4-methyl-1,3-dioxane and tetrahydropyran, especially tetrahydrofuran; and n represents 0.4 to 10 especially 0.4 to 5.

The catalysts having high catalytic activity can be obtained by using the compounds defined above.

The compounds can be prepared by adding a stoichiometric amount or excess of ether to a reaction product obtained by reacting the component (a) with the component (b), and reacting them at the room temperature to 100° C. for 0.1 to 10 hours and separating excess of the ether by suitable manner such as a heating, a distillation under a reduced pressure, an extraction or a washing. In the reaction, it is preferable to add an inert hydrocarbon solvent such as hexane and heptane.

The compound, can be also produced by preparing an ether solution or ether adduct of the component (b) and adding the component (a) to the ether solution or ether adduct, or adding the ether solution or ether adduct to the component (a) at near room temperature and then, reacting them at 50° to 200° C. preferably 50° to 150° C. for 0.1 to 10 hours and separating excess of the ether by a filtration or an evaporation from the reaction mixture. The amount of the ether in the starting materials is more than 0.3 molar ratio to Grignard reagent. The amount of the component (a) is in a range of 0.01 to 2 preferably 0.5 to 1.5 especially 0.7 to 1.3 as a molar ratio of the OH compound to alkyl group in the Grignard reagent. When excess of the ether is separated after the reaction, the molar ratio of the complexed ether to the magnesium is more than 0.4 so as to prevent the separation of the complexed ether. Accordingly, when excess of tetrahydrofuran is separated by an evaporation, the separation is carried out at near room temperature.

Suitable methods of contacting the components to form the titanium-containing catalytic component will be illustrated on the cases (1) to (4).

(1) The OH compound (a) and the Grignard reagent (b) are added to the electron donor (d) at −50° to 100° C. preferably −30° C. to room temperature. The mixture is heated to 20° to 200° C. preferably 20° to 150° C. especially 20° to 100° C. to react them for 0.1 to 10 hours. It is preferable to prevent the reaction to the Grignard reagent with the electron donor before reacting the Grignard reagent with the OH compound. Accordingly, when the electron donor easily reacts with the Grignard reagent, it is preferable to mix the OH compound and the Grignard reagent at low temperature that the reaction of the electron donor with the Grignard reagent is not performed but the reaction of the ROH compound with the Grignard reagent is performed. The reaction mixture can be used without any separation. However, it is preferable to separate the reaction product as the solid by a decantation, a filtration, or a vaporization of the solvent from the reaction mixture. When the separation of the reaction product is carried out by the decantation or the filtration to obtain the solid. The solid is washed with an inert hydrocarbon solvent and it is added to the titanium tetrahalide and the mixture is treated at 60° to 350° C. for longer than 1 minute preferably 0.1 to 10 hours.

After the treatment, the solid catalytic component is separated from the reaction mixture preferably at 50° to 140° C. and it is washed with an inert hydrocarbon solvent.

Suitable inert hydrocarbon solvents include aromatic hydrocarbons such as benzene, toluene; saturated aliphatic hydrocarbons such as n-pentane, n-hexane, n-heptane, n-octane, n-dodecane, liquid paraffin; alicyclic hydrocarbons such as cyclohexane, methyl cyclohexane, etc.

(2) The Grignard reagent (b) is added to the OH compound (a) or vice versa at −50° to 100° C. preferably −20° C. to near room temperature to cntact them. The reaction is performed at 20° to 200° C. preferably 20° to 150° C. especially 20° to 100° C. for 0.1 to 10 hours. The resulting reaction mixture or the solid separated from the reaction mixture by a filtration, a decantation or an evaporation of the solvent, is admixed with the electron donor (d) or a solution thereof. The mixture is preferably treated at 60° to 200° C.for longer than 0.1 hour preferably 0.1 to 10 hours especially 1 to 5 hours.

When toluene, xylene or kerosene is used as a diluent for the electron donor in the process, the operation is convenient because it can be treated at the boiling point thereof. It is also possible to treat the product at said temperature after adding the electron donor and distilling off the diluent to dry the product. The product is treated with the titanium tetrahalide (c) by the process (1). The conditions for treating with the titanium tetrahalide and separating and washing the product can be the same with those of the method (1).

(3) The reaction of the OH compound with the Grignard reagent is performed as the same with that of the method (2). The resulting reaction product is treated with the titanium tetrahalide as the same with that of the method (1) and then, it is treated with the electron donor as the same with that of the process (2).

(4) As the process (2), the OH compound (a) is contacted with the Grignard reagent (b) and then, the titanium tetrahalide (c) and the electron donor (d) are simultaneously added to the product and the mixture is treated by the process (1).

In this case, the complex can be previously formed by contacting the titanium tetrahalide (c) with the electron donor (d). In the operation, at desired step, the treatment with the halogenation agent (e) such as a halogen containing silicon compound can be applied. The halogenation agent (e) is usually added to a product obtained by reacting OH compound (a) with the Grignard reagent (b) optionally, the electron donor (d) and the mixture is treated at the temperature below the decomposition temperature of the halogenating agent for longer than 0.1 hour preferably 0.1 to 1 hour.

The halogenation agents used in the present invention are usually chlorination, bromination and iodination agents. The known halogenation agents can be used.

Suitable halogenation agents include halogens such as chlorine, bromine and iodine; hydrogen halides such as hydrogen chloride, hydrogen bromide and hydrogen iodide; haloalkanes such as carbon tetrachloride, chloroform, dichloroethane, tetrachloroethane, methylene chloride, trichlene, methyl chloride, ethyl chloride, n-butyl chloride, n-octyl chloride; non-metallic oxyhalides such as sulfuryl chloride, thionyl chloride, nitrosyl chloride, phosphorous oxychloride, phosgene; non-metallic halides such as phosphorous trichloride, phosphorus pentachloride, halogen containing silicon compounds; halides of metal or ammonium such as aluminum halides, ammonium halides except titanium tetrahalides.

It is preferable to use a chlorination agent as the halogenation agent.

It is especially preferable to use a halogen containing silicon compound having the formula

wherein $R^4$ represents a hydrocarbon moiety having 1 to 16 of carbon atoms or a halohydrocarbon moiety; X represents a halogen atom and $0 \leq n \leq 3$.

The typical $R^4$ is an alkyl group, a cycloalkyl group or an aryl group and the typical X is chlorine, bromine, iodine or fluorine atom. When n=0, the compounds are tetrahalosilanes having the formula SiX$_4$ The halogen atoms can be the same or different.

Suitable tetrahalosilanes include tetrachlorosilane, tetrabromosilane, tetraiodosilane, tetrafluorosilane, trichlorobromosilane, trichloroiodosilane, trichlorofluorosilane, dichlorodibromosilane, dichlorodiiodosilane, dichlorodifluorosilane, chlorotribromosilane, chlorotriiodosilane, chlorotrifluorosilane, bromotriiodosilane, bromotrifluorosilane, dibromodiiodosilane, dibromodifluorosilane, tribromoiodosilane, tribromofluorosilane, iodotrifluorosilane, diiododifluorosilane, and triiodofluorosilane.

It is preferable to use tetrachlorosilane, tetrabromosilane, trichlorobromosilane, dichlorodibromosilane or chlorotribromosilane. It is optimum to use tetrachlorosilane.

When n=1 the compounds have the formula

R$^4$SiX$_3$

Suitable compounds having the formula

R$^4$SiX$_3$ include alkyl trichlorosilanes having $C_1$-$C_{18}$ saturated alkyl group such as methyl trichlorosilane, ethyl trichlorosilane, n- and i-propyl trichlorosilanes, n-, i- and tert-butyl trichlorosilanes, n- and i-amyl trichlorosilanes, n-hexyl trichlorosilane, n-heptyl trichlorosilane, n-octyl trichlorosilane, n-dodecyl trichlorosilane, n-tetradecyl trichlorosilane, n-hexadecyl trichlorosilane; unsaturated alkyl trichlorosilanes having $C_1$-$C_4$ unsaturated alkyl group such as vinyl trichlorosilane, isobutenyl trichlorosilane; haloalkyl or unsaturated haloalkyl trichlorosilanes such as chloromethyl trichlorosilane, dichloromethyl trichlorosilane, trichloromethyl trichlorosilane, (2-chloroethyl) trichlorosilane, (1,2-dibromoethyl) trichlorosilane, trifluoromethyl trichlorosilane and (vinyl-1-chloro) trichlorosilane; saturated or unsaturated cycloalkyl trichlorosilanes such as cyclopropyl trichlorosilane, cyclopentyl trichlorosilane, cyclohexenyl trichlorosilane and 3-cyclohexenyl trichlorosilane; aryl or aralkyl trichlorosilanes such as phenyl trichlorosilane, 2-, 3- or 4-tolyl trichlorosilanes, and benzyl trichlorosilane; saturated alkyl or haloalkyl mixed trihalosilanes such as methyl difluorochlorosilane, methyl fluorodichlorosilane, ethyl difluorochlorosilane, ethyl fluorodichlorosilane, n- and i-propyl difluorochlorosilanes, n-butyl difluorochlorosilane, n-butyl fluorodichlorosilane, phenyl difluorochlorosilane, methyl dichlorobromosilane, ethyl dichlorobromosilane, methyl dichloioddosilane and (trifluoromethyl) difluorobromosilane.

When n=2, the compounds have the formula

R$_2^4$SiX$_2$

Suitable compounds include dialkyl dinalosilanes such as dimethyl dichlorosilane, diethyl dichlorosilane, di-n- and -i- propyl dichlorosilanes, di-n-, -i- and -tert-butyl dichlorosilanes, di-n- and -i-amyl dichlorosilanes, di-n-hexyl dichlorosilane, di-n-heptyl dichlorosilane and di-n-octyl dichlorosilane; dicycloalkyl dihalosilanes such as dicyclopentyl dichlorosilane, dicyclohexyl dibromosilane, dicyclohex l diiodosilane, dicyclohexyl difluorosilane; and diaryl or diaralkyl dihalosilanes such as diphenyl dichlorosilane, di-2-, -3- or -4- tolyl dichlorosilane and dibenzyl dichlorosilane.

When n=3, the compounds have the formula

R$_3^4$SiX

Suitable compounds include trialkyl halosilanes such as trimethyl chlorosilane, triethyl chlorosilane, tri(n- and i-propyl) chlorosilanes, tri(n- and i-butyl) chlorosilanes, tri(n-hexyl) chlorosilane, tri(n-heptyl chlorosilane, tri(n-octyl) chlorosilane, dimethyl (ethyl) chlorosilane, methyl (diethyl) chlorosilane; and triaryl or triaralkyl halosilanes such as triphenyl chlorosilane, tri(2-, 3- or 4-tolyl) chlorosilane, and tribenzyl chlorosilane.

It is preferable to use silicon tetrachloride, and mono-di- or tri- chlorosilanes having the formula in which R$^4$ is methyl, ethyl or phenyl group.

It is possible to use several halogenation agents. It is also possible to treat with the halogenation agent in the presence of an inert solvent or gas.

Suitable inert solvents include aromatic hydrocarbons such as benzene and toluene, liquid saturated aliphatic hydrocarbons such as n-pentane, n-hexane, n-heptane, n-octane, n-dodecane, liquid paraffin; alicyclic hydrocarbons such as cyclohexane and methyl cyclohexane.

The inert gases include nitrogen and argon gas.

The amounts of the components used in the process of the present invention are selected from the following ranges.

A molar ratio of the OH compound to alkyl group of the Grignard reagent is in a range of 0.01 to 2 preferably 0.5 to 1.5 especially 0.7 to 1.3.

When water is used as the OH compound, it is preferably less than 1.0 because the precipitate having no free water can be obtained.

A molar ratio of the electron donor to the Grignard reagent is in a range of 0.01 to 10 preferably 0.1 to 2.

A molar ratio of the titanium tetrahalide to the Grignard reagent is in a range of 0.1 to 50 preferably 1 to 30.

A molar ratio of the halogenation agent to the Grignard reagent is in a range of 0.01 to 50 preferably 0.1 to 5.

When the compound having the formula

Mg(OR$^8$)X.nE, the titanium tetrahalide (c) and the electron donor (d) are contacted, the amounts of the components are selected from the following ranges.

A molar ratio of the electron donor to Mg(OR$^8$)X in Mg(OR$^8$)X.nE is in a range of 0.2 to 10 preferably 0.4 to 4.

A molar ratio of the titanium tetrahalide to Mg(OR$^8$)X in Mg(OR$^8$)X.nE is in a range of 0.1 to 50 preferably 1 to 30.

Thus, the pale yellowish brown solid having a titanium content of 0.01 to 20 wt.%, preferably 0.1 to 10 wt.%, especially 0.5 to 10 wt.% can be obtained by contacting the OH compound, the Grignard reagent, the titanium tetrahalide and the electron donor.

The solid catalytic component having high catalytic activity for a polymerization of an olefin to provide a high stereospecific polymer can be obtained by only washing the product with the hydrocarbon solvent.

However, the solid catalytic component having higher catalytic activity can be obtained by washing with titanium tetrachloride.

When the titanium-containing solid catalytic component prepared by contacting the OH compound (a), the Grignard reagent (b), the titanium tetrahalide (c) and the electron donor (d) and washing the product with titanium tetrachloride is admixed with an organoaluminum compound to use for a polymerization of an olefin, higher catalytic acitivity and higher stereospecific property of the resulting polyolefin can be attained.

The washing operation can be carried out by adding titanium tetrachloride to the titanium containing solid catalytic component and the mixture is kept in for 0.1 to 10 hours preferably under stirring and separating titanium tetrachloride from the titanium-containing solid catalytic component.

The washing operation can be carried out at near room temperature preferably higher temperature of 50° to the boiling point of titanium tetrachloride. It is preferable to separate the washing solution from the solid catalytic component at higher temperature of 50° to 140° C. Accordingly, it is preferable to use a high temperature continuous extractor such as Soxhlet's extractor. The washing operation is effective in one step and preferably is repeated until providing a constant titanium content of the titanium-containing solid catalytic component. The titanium tetrachloride used in the washing operation can be by itself and also can be mixed with an inert hydrocarbon solvent.

Suitable inert hydrocarbon solvents include aromatic hydrocarbons such as benzene and toluene; saturated aliphatic hydrocarbons such as n-pentane, n-hexane, n-heptane, n-octane, n-dodecane, liquid paraffin; alicyclic hydrocarbons such as cyclohexane and methyl cyclohexane.

An amount of titanium tetrachloride used for one washing step is not critical and is preferably at a molar ratio of titanium tetrachloride to the magnesium compound in the solid catalytic component of 1 to 30.

After the washing step with titanium tetrachloride, the solid catalytic component is washed with an inert hydrocarbon solvent. Suitable inert hydrocarbon solvents used for the washing include the above-mentioned aromatic hydrocarbons, saturated aliphatic hydrocarbons and alicyclic hydrocarbons.

In the polymerization of an olefin, the titanium-containing solid catalytic component is combined with an organoaluminum compound to form a catalyst system.

The organoaluminum compounds have the formula

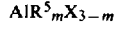

wherein $R^5$ represents a $C_1$–$C_8$ alkyl group which can be the same or different and m represents 1 to 3 and X represents a halogen atom.

Suitable organoaluminum compound used as the auxiliary catalyst in the invention include trialkylaluminum such as trimethylaluminum, triethylaluminum, tripropylaluminum, triisobutylaluminum, trihexylaluminum, trioctylaluminum; dialkylaluminum monohalides such as dimethylaluminum monochloride, diethylaluminum monochloride; alkylaluminum sesquihalides such as methylaluminum sesquichloride, ethylaluminum sesquichloride; dialkylaluminum monoalkoxides such as diethylaluminum monoethoxide, diethylaluminum monomethoxide etc.

It is preferable to use the trialkylaluminum such as triethylaluminum, tripropylaluminum, triisobutylaluminum, trihexylaluminum, trioctylaluminum, etc.

The molar ratio of the organoaluminum to Ti in the titanium-containing solid catalytic component is in a range of 1 to 500 preferably 1 to 100 especially 2 to 50.

In the process of the present invention, the polymerization of an olefin is carried out in the presence of the catalyst system comprising the organoaluminum compound and the titanium containing solid component, if necessary with the known additive for improving stereospecific property.

The additives can be electron donors such as the above-mentioned component (d) preferably carboxylic esters, phosphoric esters and phosphorous esters. It is most preferable to add the carboxylic esters having the formula

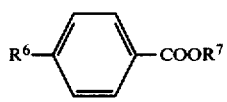

wherein $R^6$ and $R^7$ respectively represent $C_1$–$C_{10}$ alkyl groups, because the polyolefins having high stereospecific property can be obtained in high polymerization activity.

Suitable carboxylic esters having the formula include methyl p-methylbenzoate, ethyl p-methylbenzoate, propyl p-methylbenzoate, butyl p-methylbenzoate, hexyl p-methylbenzoate, octyl p-methylbenzoate, methyl p-ethylbenzoate, ethyl p-ethylbenzoate, propyl p-ethylbenzoate, butyl p-ethylbenzoate, hexyl p-ethylbenzoate, octyl p-ethylbenzoate, methyl p-butylbenzoate, ethyl p-butylbenzoate, propyl p-butylbenzoate, butyl p-butylbenzoate, hexyl p-butylbenzoate, octyl p-butylbenzoate, methyl p-hexylbenzoate, ethyl p-hexylbenzoate, propyl p-hexylbenzoate, butyl p-hexylbenzoate, hexyl p-hexylbenzoate, octyl p-hexylbenzoate, methyl p-octylbenzoate, ethyl p-octylbenzoate, propyl p-octylbenzoate, butyl p-octylbenzoate, hexyl p-octylbenzoate, octyl p-octylbenzoate, etc.

The benzoates having the formula wherein $R^6$ and $R^7$ represent $C_1$ to $C_4$ alkyl groups are especially effective.

The method of the addition of the additive is not limited. The additive can be added to the organoaluminum compound or the titanium-containing solid catalytic component or a mixture thereof.

The molar ratio of the additive of Ti in the titanium-containing solid catalytic component is in a range of 0.1–200 preferably 0.1 to 40 especially 1 to 10.

The olefins can be α-olefins such as ethylene, propylene, butene-1, etc.

The polyolefins can be advantageously obtained by a homopolymerization, a random copolymerization or a block copolymerization with two or more monomers with the catalyst system of the invention.

In the copolymerization, it is preferable to use less than 10 wt.% of a comonomer in the copolymer.

The catalyst system of the invention is preferably used in the homopolymerization of propylene or the copolymerization of propylene and the other α-olefin.

In the process of the present invention, the homopolymerization or copolymerization can be carried out by a solution polymerization in an inert hydrocarbon or liquefied propylene, a slurry polymerization or a gaseous polymerization without any solvent. It is possible to add any additive as desired.

The polymerization is carried out at 20° to 100° C. preferably 50° to 80° C. under the pressure from the atmospheric pressure to 100 atm.

The molecular weight of the resulting polyolefin can be controlled by the presence of hydrogen in the polymerization zone.

As described in detail, in accordance with the process of the present invention, the polyolefins having excellent stereospecific property can be easily obtained. Since the stereospecific property of the resulting polyolefin is remarkably high, the separation of amorphous polymer (atactic polymer) from the resulting polyolefin can be eliminated. The titanium-containing solid catalytic component used in the present invention has remarkably high polymerization activity. Accordingly, the step of removing the catalyst residue from the resulting polyolefin can be also eliminated, advantageously.

The invention will further illustrated by certain Examples which are provided herein for purpose of illustration only and are not intended to be limiting in any manner unless otherwise specified.

In the Examples and References, the isotactic index (I.I.) was given as a weight percent of a solid residue after an extraction with boiled n-heptane for 6 hours by an improved Soxhlet extractor, and melt index (MFI) was measured by ASTM D-1238.

EXAMPLE 1

(I) Preparation of titanium containing solid catalytic component

In a 500 ml four necked flask which was purged with dry nitrogen gas, 32 ml of di-n-butyl ester solution containing chloro-n-butyl magnesium at a concentration of 3.2 m mole/ml, was charged and 160 ml of ethyl ether solution containing 100 m mole of water was added dropwise to the solution at 25° C. under vigorously stirring to form white precipitate. After the addition, the mixture was stirred at 25° C. for 1 hour and the temperature was raised to 45° C. and the mixture was further stirred for 1 hour. During the operation, ethyl ether was distilled off. The reaction mixture was dried under a reduced pressure by distilling off the solvent to obtain 7.55 g of white powder. The atomic ratio of Cl/Mg of the resulting powder was 0.90.

Then, 20 ml of toluene solution containing ethyl benzoate at a concentration of 1 m mole/ml was added to the powder and after the addition, the mixture was heated at 110° C. and stirred for 1.5 hours. Then, 220 ml of titanium tetrachloride was added and the mixture was heated to 130° C. for 1 hour and the suspension of the reaction mixture was decanted without cooling it and the product was repeatedly washed with heptane until disappearing the symptom of chlorine in the washing solution to obtain a pale yellow solid catalytic component. The titanium content in the solid was 6.2 wt. %.

(II) Polymerization of olefin

The polymerization of olefin was carried out by using the catalystic component prepared by the process (I).

In a 1 liter four necked flask which was purged with dry nitrogen gas, 500 ml of n-heptane, 0.22 m mole of triethyl aluminum and 42.0 mg of the titanium containing solid catalyst prepared by the process of (I) were charged. The molar ratio of Al/Ti was 4.

Then, the mixture was heated to 70° C. under stirring it and propylene gas was introduced under the atmospheric pressure to perform the polymerization for 2 hours. The polymerization was stopped by adding a small amount of i-propyl alcohol. The content was added into methanol and the precipitate was separated and dried to obtain 16.0 g of white powdery polypropylene.

The polymerization activity of the catalyst, $K_{cat}$ given as $K_{cat}$=polymer (g)/Ti cat. component (g)×time (hr)×propylene pressure (Kg/cm$^2$) was 317, and $K_{Ti}$ given as $K_{Ti}$=polymer (g)/titanium (g)×time (hr)×propylene pressure (Kg/cm$^2$) was 5,110 and the isotactic index (II) was 72.5% and the melt index (MFI) was 2.2.

The results are shown in Table 1.

References 1 and 2

The preparation of titanium-containing solid catalytic component was repeated in accordance with the process (I) of Example 1 except using magnesium hydroxychloride prepared by preheating MgCl$_2$.6H$_2$O at 200° C. for 20 hours and pulverizing it in a vibration mill for 72 hours and heating at 285° C. in dry nitrogen gas in a quartz tube instead of the reaction product of water and chloro-n-butyl magnesium.

The polymerization of propylene was repeated in accordance with the process (II) of Example 1 except varying the molar ratio of Al/Ti to 4 or 30. The results are shown in Table 1.

From the results, it was found that the polymerization activity and the isotactic index I.I. were remarkably different depending upon the solid carrier used for the preparation of titanium containing catalytic component.

TABLE 1

|  | Ti content in solid catalytic component(wt. %) | Al/Ti molar ratio | K | | I.I. (%) |
|---|---|---|---|---|---|
|  |  |  | $K_{cat}$ | $K_{Ti}$ |  |
| Exp.-1 | 6.2 | 4 | 317 | 5110 | 72.5 |
| Ref.-1 | 1.3 | 4 | 25 | 1920 | 45.3 |
| Ref.-2 | 1.3 | 30 | 20 | 1540 | 41.5 |

As shown in Example 1 and References 1 and 2, when the catalyst of the present invention is used the polymerization activity is remarkably higher and the isomatic index of the resulting polyolefin is remarkably higher in comparison with those of the use of the catalysts prepared by using magnesium hydroxychloride in the same process. The fact shows that the magnesium compound produced by using water and Grignard reagent in the preparation of the titanium-containing solid catalytic component is different from the magnesium hydroxychloride. The X-ray diffractomaric diagram of the magnesium compounds of the invention has not diffraction peaks of magnesium hydrochloride described in ASTM-24-726, and the fact shows that the magnesium compound is amorphous substrate.

EXAMPLES 2 TO 3

The polymerization of propylene was repeated in accordance with the process (II) of Example 1 except varying the molar ratio of Al/Ti as shown in Table 2.

The results are shown in Table 2.

TABLE 2

|  | A/Ti molar ratio | K$_{cat}$ | K$_{Ti}$ | I.I. (%) |
|---|---|---|---|---|
| Exp.-2 | 8 | 310 | 5000 | 71.3 |
| Exp.-3 | 15 | 265 | 4270 | 68.8 |

EXAMPLE 4

The preparation of titanium-containing solid catalytic component was repeated in accordance with the process (I) of Example 1 except using 80 ml of tetrahydrofuran solution containing 100 m mole of water instead of the water containing ethyl ether.

The polymerization of propylene was repeated in accordance with the process (II) of Example 1 except using the catalytic component.

The results are shown in Table 3.

EXAMPLE 5

The preparation of titanium-containing solid catalytic component was repeated in accordance with the process (I) of Example 1 except using 100 ml of di-n-butyl ether solution containing chloro-n-butyl magnesium at a concentration of 1 m mole/ml and 100 m moles of water instead of ethyl ether solution containing water.

The polymerization of propylene was repeated in accordance with the process (II) of Example 1 except using the catalytic component.

The results are shown in Table 3.

TABLE 3

|  | Ti content in solid catalytic component(wt. %) | K$_{cat}$ | K$_{Ti}$ | I.I. (%) |
|---|---|---|---|---|
| Exp.-4 | 10.8 | 185 | 1710 | 75.3 |
| Exp.-5 | 8.8 | 223 | 2530 | 70.2 |

EXAMPLES 6 TO 7

The preparation of titanium-containing solid catalytic component was repeated in accordance with the process (I) of Example 1 except varying a molar ratio of ethyl benzoate/Mg as shown in Table 4.

The polymerization of propylene was repeated in accordance with the process (II) of Example 1 except using the catalytic component.

The results are shown in Table 4.

TABLE 4

|  | molar ratio ethylacetate/Mg | Ti content in cat.(wt. %) | K$_{cat}$ | K$_{Ti}$ | I.I. (%) |
|---|---|---|---|---|---|
| Exp.-1 | 0.2 | 6.2 | 317 | 5110 | 72.5 |
| Exp.-6 | 0.8 | 8.8 | 280 | 3180 | 80.6 |
| Exp.-7 | 1.0 | 10.4 | 61 | 590 | 90.5 |

EXAMPLE 8

The preparation of titanium-containing catalytic component was repeated in accordance with the process (I) of Example 1 except varying the amount of the toluene solution containing ethyl benzoate at a concentration of 1 m mole/ml from 20 to 80 ml, and adding 220 ml of titanium tetrachloride after decanting the suspension of the reaction mixture before washing it with heptane and stirring at 130° C. for 1 hour and decanting again the suspension. The titanium content was 2.9 wt. %.

The polymerization of propylene was repeated in accordance with the process (II) of Example 1 except using 53.8 mg of the catalytic component and 0.22 m mole of triethyl aluminum to obtain 43.3 g white powdery polypropylene. The polymerization activity of the catalyst K$_{cat}$ was 671 and K$_{Ti}$ was 23,140, and the isotactic index I.I. was 80.3% and MFI was 3.0.

EXAMPLES 9 TO 11

The preparation of titanium-containing catalytic component was repeated in accordance with the process of Example 8 except washing two times after the treatment of titanium tetrachloride. The titanium content was 2.4 wt. %.

The polymerization of propylene was repeated in accordance with the process of Example 8 except using the catalytic component and varying the molar ratio of Al/Ti as shown in Table 5.

The results are shown in Table 5.

TABLE 5

|  | Al/Ti molar ratio | K$_{cat}$ | K$_{Ti}$ | I.I. (%) |
|---|---|---|---|---|
| Exp.- 9 | 4 | 1400 | 58,330 | 65.4 |
| Exp.-10 | 8 | 1240 | 51,670 | 60.5 |
| Exp.-11 | 15 | 1080 | 45,000 | 60.0 |

EXAMPLES 12 TO 14

The preparation of titanium-containing solid catalytic component was repeated in accordance with the process of Example 8 except varying the molar ratio of ethyl benzoate/Mg as shown in Table 6.

The polymerization of propylene was repeated in accordance with the process of Example 8 except using the catalytic component.

The results are shown in Table 6.

EXAMPLE 15

The preparation of titanium-containing catalytic component was repeated in accordance with the process of Example 8 except varying the amount of the toluene solution of ethyl benzoate from 80 ml to 100 ml and heating the mixture at 110° C. for 1.5 hours after the addition of the toluene solution of ethyl benzoate and washing the product with n-heptane and drying it before treating with titanium tetrachloride.

The polymerization of propylene was repeated in accordance with the process of Example 8 except using the catalytic component.

TABLE 6

|  | ethyl benzoate/Mg molar ratio | Ti content in cat(wt. %) | K$_{cat}$ | K$_{Ti}$ | I.I. (%) |
|---|---|---|---|---|---|
| Exp.-12 | 0.2 | 2.8 | 817 | 29,180 | 47.5 |
| Exp.-13 | 0.5 | 3.0 | 720 | 24,000 | 68.9 |
| Exp.-14 | 1.0 | 3.4 | 135 | 3,970 | 92.5 |
| Exp.-15 | 1.0 | 3.0 | 705 | 23,500 | 60.5 |

EXAMPLE 16

In a 500 m four necked flask which was purged with dry nitrogen, 32 ml of d-n-butyl ether solution containing chloro-n-butyl magnesium at a concentration of 3.2 m mole/ml was charged and the temperature was cooled to −20° C., and 100 m mole of ethyl benzoate was added dropwise under maintaining the temperature and stirring it, and then, 160 ml of ethyl ether solution containing 100 m mole of water was added dropwise under maintaining at −20° C. to form white precipitate. After the addition, the mixture was stirred at −20° C. for 2 hours and heated to 45° C. and further stirred for 1 hour. The supernatant liquid was decanted and the precipitate was washed with n-heptane and dried to obtain the solid and 220 ml of titanium tetrachloride was added and heated at 130° C. for 1 hour, and the suspension of the reaction mixture was decanted without cooling, and the precipitate was washed with n-heptane to obtain the solid catalytic component having 6.3 wt. % of the titanium content.

The polymerization of propylene was repeated in accordance with the process (II) of Example 1 except using 40.0 mg of the solid catalytic component and 0.21 m mole of triethyl aluminum to obtain 14.0 g of white powdary polypropylene.

The polymerization activity of the catalyst, $K_{cat}$ was 292 and $K_{Ti}$ was 4,640 and the isotactic index I.I. was 72.8% and MFI was 2.5.

EXAMPLES 17 TO 20

The preparation of the titanium-containing solid catalytic component was repeated in accordance with the process (I) of Example 1 except using various electron donors shown in Table 7 instead of ethyl benzoate.

The polymerization of propylene was repeated in accordance with the process (II) of Example 1 except using the catalytic components.

The results are shown in Table 7.

TABLE 7

| | Electron donor | Ti content in cat.(wt. %) | $K_{cat}$ | $K_{Ti}$ | I.I. (%) |
|---|---|---|---|---|---|
| Exp.-17 | dimethyl glycine ethyl ester | 9.8 | 180 | 1840 | 78.5 |
| Exp.-18 | phenyl acetate | 6.5 | 300 | 4620 | 70.5 |
| Exp.-19 | tetramethyl ethylenediamine | 10.5 | 194 | 1850 | 80.3 |
| Exp.-20 | hexamethylphosphoric triamide | 9.6 | 165 | 1720 | 66.9 |

EXAMPLE 21

(I) Preparation of titanium containing solid catalytic component

In a 500 ml four necked flask, which was purged with dry nitrogen gas, 150 ml of toluene, and 40 ml of di-n-butyl ether solution containing chloro-n-butyl magnesium (n-$C_4H_9MgCl$) at a concentration of 2.5 m mole/ml were charged and 5.8 ml of ethanol (100 m mole) was added dropwise at 25° C. under vigorously stirring. The molar ratio of EtOH/n-BuMgCl was 1.0. After the addition, the mixture was further stirred at 25° C. for 1 hour, and heated to 80° C. and further stirred for 1 hour. The reaction product was washed 5 times with each 150 ml of heptane and heptane was distilled off under a reduced pressure and the product was dried to obtain white powder of $(C_2H_5O)_{0.98}MgCl_{0.93}$.

Then, 150 ml of toluene and 2.9 ml (20 m mole) of ethyl benzoate were added to the resulting powder at 25° C. The atomic ratio of Mg/ethyl benzoate was 0.2. After the addition, the mixture was heated to 110° C. and stirred for 1 hour. The reaction mixture was dried under a reduced pressure to distil off toluene to obtain white powder. Then, 220 ml (2 mole) of titanium tetrachloride ($TiCl_4$) was added at 25° C. under stirring. The molar ratio of $TiCl_4$/Mg was 20. After the addition, the mixture was heated at 130° C. and stirred for 1 hour. Then, the suspension of the reaction mixture was decanted without cooling it and the residual solid was repeatedly washed with heptane until disappearing the sympton of chlorine in the washing solution to obtain a pale yellow solid catalytic component. The titanium content in the solid was 2.4 wt. %.

(II) Polymerization of olefin

The polymerization of olefin was carried out by using the catalytic component prepared by the process (I).

In a 1 liter necked flask which was purged with dry nitrogen gas, 500 ml of n-heptane, 0.10 m mole of triethyl aluminum and 50.0 mg of the titanium-containing solid catalyst prepared by the process of (I) were charged. The molar ratio of Al/Ti was 4.

Then, the mixture was heated to 70° C. under stirring it and propylene gas was introduced under the atmospheric pressure to perform the polymerization for 2 hours. The polymerization was stopped by adding a small amount of i-propyl alcohol. The content was added into methanol and the precipitate was separated and dried to obtain 19.4 g of white powdery polypropylene.

The polymerization activity of the catalyst, $K_{cat}$ was 323 and $K_{Ti}$ was 13,470 and the isotactic index (I.I.) was 85.2% and MFI was 2.6.

Reference 3

The preparation of titanium-containing solid catalytic component was repeated in accordance with the process (I) of Example 21 except adding ethyl benzoate to obtain a catalytic component having 3.3 wt. % of the titanium content.

The polymerization of propylene was repeated in accordance with the process (II) of Example 21 except using the catalytic component to obtain 27.8 g of polypropylene. The polymerization activity of the catalyst, $K_{cat}$ was 463 and $K_{Ti}$ was 14,040 and the isotactic index I.I. was 29.3%.

EXAMPLES 22 TO 26 AND REFERENCES 4 to 8

The preparation of the catalytic component was repeated in accordance with the process (I) of Example 21 except using various alcohols instead of ethanol.

The polymerization of propylene was repeated in accordance with the process (II) of Example 21 except using the catalytic component.

The results are shown in Table 8 together with the results obtained without adding ethyl benzoate in the preparation of the catalytic component.

TABLE 8

| | Preparation of Ti containing catalytic component | | | Results of polymerization | | |
|---|---|---|---|---|---|---|
| | Type of alcohol | Addition of ethyl benzoate | Ti content (wt. %) | $K_{cat}$ | $K_{Ti}$ | I.I. |
| Exp.-22 | isopropanol | add | 5.3 | 353 | 6660 | 89.1 |
| Ref.- 4 | " | none | 5.9 | 397 | 6730 | 43.2 |
| Exp.-23 | n-butanol | add | 3.6 | 365 | 10140 | 86.7 |
| Ref.- 5 | " | none | 4.1 | 421 | 10270 | 38.6 |
| Exp.-24 | n-hexanol | add | 4.0 | 321 | 8030 | 90.1 |
| Ref.- 6 | " | none | 6.7 | 382 | 5700 | 36.9 |
| Exp.-25 | n-octanol | add | 2.1 | 396 | 18860 | 87.6 |
| Ref.- 7 | " | none | 2.9 | 411 | 14170 | 58.6 |

TABLE 8-continued

| | Preparation of Ti containing catalytic component | | | Results of polymerization | | |
|---|---|---|---|---|---|---|
| | Type of alcohol | Addition of ethyl benzoate | Ti content (wt. %) | $K_{cat}$ | $K_{Ti}$ | I.I. |
| Exp.-26 | n-decanol | add | 3.6 | 295 | 8190 | 89.8 |
| Ref.-8 | " | none | 5.2 | 350 | 6730 | 39.5 |

EXAMPLES 27 TO 30

The preparation of the catalytic component was repeated in accordance with the process (I) of Example 21 except varying the molar ratio of ethyl benzoate/Mg. (EB/Mg).

The polymerization of propylene was repeated in accordance with the process (II) of Example 21 except using the catalytic component.

The results are shown in Table 9.

TABLE 9

| | Preparation of Ti containing catalytic component | | | Results of polymerization | | |
|---|---|---|---|---|---|---|
| | Type of alcohol | EB/Mg | Ti content (wt. %) | $K_{cat}$ | $K_{Ti}$ | I.I. |
| Exp.-27 | ethanol | 0.4 | 3.1 | 330 | 10650 | 86.0 |
| Exp.-28 | " | 0.6 | 3.2 | 305 | 9530 | 86.1 |
| Exp.-29 | " | 0.8 | 5.8 | 227 | 3910 | 88.3 |
| Exp.-30 | " | 1.0 | 8.9 | 72 | 810 | 93.1 |

EXAMPLES 31 TO 37

The preparation of the catalytic component was repeated in accordance with the process (I) of Example 21 except using various election donors shown in Table 10 instead of ethyl benzoate.

The polymerization of propylene was repeated in accordance with the process (II) of Example 21 except using the catalytic component.

The results are shown in Table 10.

TABLE 10

| | Preparation of Ti containing catalytic component | | | Results of polymerization | | |
|---|---|---|---|---|---|---|
| | Type of Electron donor (ED) | ED/Mg molar ratio | Ti content (wt. %) | $K_{cat}$ | $K_{Ti}$ | I.I. |
| Exp.-31 | methyl benzoate | 0.2 | 3.0 | 305 | 10170 | 83.1 |
| Exp.-32 | ethyl benzoate | " | 4.3 | 358 | 8330 | 84.5 |
| Exp.-33 | phenyl acetate | " | 2.8 | 311 | 11110 | 85.8 |
| Exp.-34 | dimethyl glycine ethyl ester | " | 4.1 | 301 | 7340 | 87.0 |
| Exp.-35 | ethyl crotonate | 0.2 | 2.5 | 283 | 11320 | 90.4 |
| Exp.-36 | hexamethyl phosphoric triamide | " | 6.8 | 185 | 2720 | 91.3 |
| Exp.-37 | triphenyl phosphite | " | 7.1 | 163 | 2300 | 90.1 |

EXAMPLE 38

In a 500 ml four necked flask which was purged with dry nitrogen gas, 150 ml of toluene and 32.3 ml of tetrahydrofuran solution containing chloro-n-butyl magnesium (n-$C_4H_9MgCl$) at a concentration of 3.1 m mole/ml were charged and cooled to $-30°$ C., and 14.3 ml (100 m mole) of ethyl benzoate was added dropwise at $-30°$ C. under stirring and then 5.8 ml (100 m mole) of ethanol was added dropwise at $-30°$ C. under stirring it to obtain white precipitate. The molar ratio of ethyl benzoate/Mg was 1.0 and the molar ratio of ethanol/Mg was 1.0. After the addition, the mixture was stirred at $-30°$ C. for 3 hours and heated to 60° C. and further stirred for 2 hours. The supernatant liquid was decanted and the precipitate was washed 5 times with each 150 ml of heptane and dried under a reduced pressure to distill off heptane to obtain white powder.

Then, 220 ml (2 mole) of $TiCl_4$ was added to the powder at 25° C. under stirring. The molar ratio of $TiCl_4$/Mg was 20. After the addition, the mixture was heated at 130° C. and stirred at the temperture for 1 hour. The suspension of the reaction mixture was decanted without cooling it and the residual solid was washed 5 times with each 150 ml of heptane to obtain the solid catalytic component having 3.2 wt. % of the titanium content.

The polymerization of propylene was repeated in accordance with the process (II) of Example 21 except using 40 mg of the catalytic component and 0.107 m mole of triethyl aluminum to obtain 12.7 g of white powdery polypropylene.

The polymerization activity of the catalyst $K_{cat}$ was 265, and $K_{Ti}$ was 8,270 and the isotactic index I.I. was 82.5% and MFI was 3. 1.

EXAMPLE 39

(I) Preparation of titanium containing solid catalytic component (I)-(A) Magnesium hydroxy-chloride-ether complex In a 500 ml four necked flask which was purged with dry nitrogen gas, 87 ml of tetrahydrofuran solution containing chloro-n-butyl magnesium at a concentration of 2.3 m mole/ml was charged and 150 ml of tetrahydrofuran solution containing 200 m mole of water was added dropwise at 25° C. during 30 minutes under stirring, and the mixture was heated to 60° C. and stirred for 1 hour and then, the product was washed 3 times with each 250 ml of n-heptane, and the solvent was removed at the room temperature to obtain white powder. The atomic ratio of Cl/Mg of the powder was 0.93. The powder was dissolved with ethanol and tetrahydrofuran in ethanol was analyzed by the gas chromatography. It was confirmed that 1.37 mole of tetrahydrofuran per 1 mole of magnesium (THF/Mg) in magnesium hydroxy chloride formed a complex.

(I)-(B) Preparation of titanium containing solid catalyst

A 2.2 g of the resulting powder was admixed with 23 ml of toluene and 35.2 m mole of ethyl benzoate and the mixture was heated at 60° C. for 2 hours and the product was washed with n-heptane and the solvent was destilled off under a reduced pressure. Then, 28 ml of titanium tetrachloride was added to the residue and the mixture was heated at 130° C. for 1 hour, and the product was washed 2 times with each 50 ml of toluene and then, washed with n-heptane to obtain gray-green solid having 3.29 wt. % of the titanium content.

(II) Polymerization of propylene

The polymerization of an olefin was carried out by using the catalytic component prepared by the process (I)-(B).

In a 500 ml four necked flask, 200 ml of n-heptane, 0.10 m mole of triethyl aluminum and 20 mg of the titanium-containing solid catalytic component prepared by the process (I)-(B) were charged. The mixture was heated to 70° C. under stirring it and propylene gas was introduced under the atmospheric pressure to perform the polymerization for 2 hours. The polymerization was stopped by adding a small amount of i-propyl alcohol. The content was added into methanol and the precipitate was separated and dried to obtain 28 g of white powdery polypropylene.

The polymerization activity of the catalyst $K_{cat}$ was 1167 and $K_{Ti}$ was 35,500 and the isotactic index I.I. was 77.3%.

Reference 9

The preparation of titanium-containing solid catalytic component was repeated in accordance with the process (I)-(B) of Example 39 except using magnesium hydroxy-chloride prepared by heating $MgCl_2.6H_2O$ at 200° C. for 20 hours and pulverizing it for 72 hours by a vibration mill and heating it at 285° C. in the presence of dry nitrogen gas in a quartz tube instead of the tetrahydrofuran complex of the reaction product of water and chloro-n-butyl magnesium.

The polymerization of propylene was repeated in accordance with the process (II) of Example 39.

The polymerization activity of the catalyst $K_{cat}$ was 25 and $K_{Ti}$ was 1,920 and the isotactic index I.I. was 45.3%.

EXAMPLES 40 TO 42

The preparation of titanium-containing solid catalytic component was repeated in accordance with the process (I)-(B) of Example 39 except treating the tetrahydrofuran complex of magnesium hydroxy chloride obtained by the process (I)-(A) of Example 39 under a reduced pressure or adding tetrahydrofuran in toluene solvent so as to control the complex of tetrahydrofuran (THF/Mg) as shown in Table 11.

The polymerization of propylene was repeated in accordance with the process (II) of Example 39.

The results are shown in Table 11.

TABLE 11

|  | THF/Mg | $K_{cat}$ | $K_{Ti} \times 10^{-3}$ | I.I. |
|---|---|---|---|---|
| Exp.-40 | 0.42 | 957 | 25.0 | 71.1 |
| Exp.-41 | 2.38 | 1266 | 42.8 | 69.8 |
| Exp.-42 | 5.63 | 1248 | 41.3 | 70.3 |

EXAMPLE 43

The polymerization of propylene was carried out by using the titanium-containing solid catalytic component obtained by the process (I)-(B) of Example 39.

In a 500 ml four necked flask which was purged with dry nitrogen gas, 200 ml of n-heptane, 0.20 m mole of triethyl aluminum, 0.0310 m mole of ethyl benzoate and 26 mg of the titanium-containing solid catalytic component were charged.

Then, the mixture was heated to 70° C. under stirring it and propylene gas was introduced under the atmospheric pressure to perform the polymerization for 2 hours. The polymerization was stopped by adding a small amount of i-propyl alcohol. The content was added into methanol and the precipitate was separated and dried to obtain 23.8 g of white powdery polypropylene.

The polymerization activity of the catalyst, $K_{cat}$ was 763 and $K_{Ti}$ was 23,200 and the isotactic index I.I. was 91.6%.

EXAMPLE 44

A 25 ml of titanium tetrachloride was added to 2.0 g of the reaction product of water and chloro-n-butyl magnesium obtained by the process (I)-(A) of Example 39 and the mixture was heated at 130° C. for 1 hour and then, washed with n-heptane and 31.9 m mole of ethyl benzoate was added and the mixture was heated at 60° C. for 1 hour and then, washed with n-heptane to obtain a solid catalytic component having 3.02 wt. % of the titanium content.

The polymerization of propylene was repeated in accordance with the process (II) of Example 39 except using the resulting catalytic component.

The polymerization activity of the catalyst $K_{cat}$ was 938 and $K_{Ti}$ was 31,100 and the isotactic index I.I. was 79.1%.

EXAMPLE 45

A mixture of 28 ml of titanium tetrachloride and 35.2 m mole of benzoic acid was added to 2.2 g of the reaction product of water and chloro-n-butyl magnesium obtained by the process (I)-(A) of Example 39, and the mixture was heated at 130° C. for 1 hour and then, it was washed 2 times with each 50 ml of toluene and then, with n-heptane to obtain a solid catalytic component having 3.44 wt. % of the titanium content.

The polymerization of propylene was repeatd in accordance with the process (II) of Example 39 except using the resulting catalytic component.

The polymerization activity of the catalyst $K_{cat}$ was 728 and $K_{Ti}$ was 21,200 and the isotactic index I.I. was 82.0%.

EXAMPLES 46 TO 50

The preparation of the catalytic component and the polymerization of propylene were repeated in accordance with the process of Example 39 except using various ethers shown in Table 12 instead of tetrahydrofuran in the process (I)-(A).

The results are shown in Table 12.

TABLE 12

|  | Ether | $K_{cat}$ | $K_{Ti} \times 10^{-3}$ | I.I. |
|---|---|---|---|---|
| Exp.-46 | diethyl ether | 993 | 31.9 | 72.3 |
| Exp.-47 | di-n-butyl ether | 1063 | 35.6 | 75.6 |
| Exp.-48 | di-n-octyl ether | 981 | 32.9 | 69.3 |
| Exp.-49 | ethyleneglycol dimethyl ether | 970 | 32.2 | 70.0 |
| Exp.-50 | tetrahydropyran | 1023 | 31.8 | 74.2 |

EXAMPLES 51 to 53

The preparation of the catalytic component and the polymerization of propylene were repeated in accordance with the process of Example 39 except using various electron donors shown in Table 13 instead of ethyl benzoate in the process (I)-(B).

The results are as follows.

TABLE 13

|  | Electron donor | $K_{cat}$ | $K_{Ti} \times 10^{-3}$ | I.I. |
|---|---|---|---|---|
| Exp.-51 | phenyl acetate | 966 | 33.5 | 70.2 |
| Exp.-52 | ethyl cinnamate | 891 | 29.7 | 68.3 |
| Exp.-53 | tetramethyl ethylene diamine | 822 | 24.8 | 64.1 |

EXAMPLE 54

(I) Preparation of titanium containing solid catalytic component (I)-(A) Magnesium ethoxychloride ether complex In a 500 ml four necked flask which was purged with dry nitrogen gas, 43 ml of tetrahydrofuran solution containing chloro-n-butyl magnesium at a concentration of 2.3 m mole/ml was charged and then, 150 ml of tetrahydrofuran solution containing 100 m mole of ethanol was added dropwise at 25° C. during 30 minutes under stirring it, and the mixture was heated to 60° C. and stirred for 1 hour and then, washed 3 times with 250 ml of n-heptane and the solvent was distilled off at the room temperature to obtain white powder. The atomic ratio of Cl/Mg of the powder was 0.93.

The powder was dissolved in ethanol and tetrahydrofuran in ethanol was analyzed by the gas chromatography analysis to confirm the fact that 1.3 mole of tetrahydrofuran per 1 mole of magnesium in the magnesium ethoxy chloride (THF/Mg) was complexed.

(I)-(B) Preparation of titanium containing solid catalytic component

A 25 ml of toluene and 35.3 m mole of ethyl benzoate were added to 2.5 g of the resulting powder and the mixture was heated at 60° C. for 2 hours and washed with n-heptane and the solvent was distilled off under a reduced pressure. Then, 28 ml of titanium tetrachloride was added to the residue and the mixture was heated at 130° C. for 1 hour and washed with n-heptane to obtain grey green solid having 3.0 wt. % of the titanium content.

(II) Polymerization of olefin

The polymerization of olefin was carried out by using the catalytic component prepared by the process (I)-(B).

In a 500 ml four necked flask which was purged with dry nitrogen gas, 200 ml of n-heptane, 0.10 m mole of triethyl aluminum and 20 mg of the titanium-containing solid catalyst prepared by the process of (I)-(B) were charged.

Then, the mixture was heated to 70° C. under stirring it and propylene gas was introduced under the atmospheric pressure to perform the polymerization for 2 hours. The polymerization was stopped by adding a small amount of i-propyl alcohol. The content was added into methanol and the precipitate was separated and dried to obtain 14.8 g of white powdery polypropylene.

The polymerization activity of the catalyst, $K_{cat}$ was 617 and $K_{Ti}$ was 20,560 and the isotactic index I.I. was 85.3%.

EXAMPLES 55 TO 57

The preparation of titanium-containing solid catalytic component was repeated in accordance with the process (I)-(B) of Example 54 except controlling the amount of the complex of tetrahydrofuran (THF/Mg) as shown in Table 14 by treating the tetrahydrofuran complex of magnesium ethoxychloride obtained by the process (I)-(A) under a reduced pressure or by adding tetrahydrofuran.

The polymerization of propylene was repeated in accordance with the process (II) of Example 54.

The results are shown in Table 14.

TABLE 14

|  | THF/Mg | Ti content in cat.(wt. %) | $K_{cat}$ | $K_{Ti}$ | I.I. (%) |
|---|---|---|---|---|---|
| Exp.-55 | 0.4 | 2.9 | 461 | 15900 | 89.5 |
| Exp.-56 | 2.1 | 3.3 | 625 | 18940 | 87.1 |
| Exp.-57 | 5.1 | 3.5 | 585 | 16710 | 84.3 |

EXAMPLE 58

The polymerization of propylene was carried out by using the titanium containing solid catalytic component obtained in the process (I)-(B) of Example 54.

In a 500 ml four necked flask which was purged with dry nitrogen gas, 200 ml of n-heptane, 0.15 m mole of triethyl aluminum 0.025 m mole of methyl p-methyl benzoate and 20 mg of the titanium-containing solid catalyst were charged.

Then, the mixture was heated to 70° C. under stirring it and propylene gas was introduced under the atmospheric pressure to perform the polymerization for 2 hours. The polymerization was stopped by adding a small amount of i-propyl alcohol. The content was added into methanol and the precipitate was separated and dried to obtain 10.3 g of white powdery polypropylene.

The polymerization activity of the catalyst, $K_{cat}$ was 429 and $K_{Ti}$ was 14,310 and the isotactic index I.I. was 93.5%

EXAMPLE 59

A 20 ml of titanium tetrachloride was added to 2.0 g of the reaction product of ethanol and chloro-n-butyl magnesium obtained by the process (I)-(A) of Example 54 and the mixture was heated to 130° C. for 1 hour and washed with n-heptane and then, 30 m mole of ethyl benzoate was added and the mixture was heated at 60° C. for 1 hour and washed with n-heptane to obtain the solid catalytic component having 2.9 wt. % of the titanium content.

The polymerization of propylene was repeated in accordance with the process (II) of Example 54 except using the resulting catalytic component.

The polymerization activity of the catalyst $K_{cat}$ was 510 and $K_{Ti}$ was 17,590 and the isotactic index I.I. was 86.5%.

EXAMPLE 60

The mixture of 20 ml of titanium tetrachloride and 30 m mole of ethyl benzoate was added to 2.0 g of the reaction product of ethanol and chloro-n-butyl magnesium obtained by the process (I)-(A) of Example 54 and the mixture was heated at 130° C. for 1 hour and washed with n-heptane to obtain a solid catalytic component having 3.2 wt. % of the titanium content.

The polymerization of propylene was repeated in accordance with the process (II) of Example 54 except using the catalytic component.

The polymerization activity of the catalyst $K_{cat}$ was 620 and $K_{Ti}$ was 19,380 and the isotactic index I.I. was 85.1.%.

EXAMPLES 61 TO 63

The preparation of the catalytic component and the polymerization of propylene were repeated in accordance with the process of Example 54 except using various ethers shown in Table 15 instead of tetrahydrofuran in the process (I)-(A).

The results are shown in Table 15.

TABLE 15

| | Ether | Ti content in cat. (wt. %) | $K_{cat}$ | $K_{Ti}$ | I.I. (%) |
|---|---|---|---|---|---|
| Exp.-61 | diethyl ether | 3.0 | 590 | 19,670 | 86.5 |
| Exp.-62 | di-n-butyl ether | 2.8 | 620 | 22,140 | 84.8 |
| Exp.-63 | ethyleneglycol dimethyl ether | 3.1 | 445 | 14,350 | 87.1 |

EXAMPLES 64 TO 67

The preparation of catalytic component and the polymerization of propylene were repeated in accordance with the process of Example 54 except using various electron donors shown in Table 16 instead of ethyl benzoate in the process (I)-(B).

The results are shown in Table 16.

TABLE 16

| | Electron donor | Ti content in cat. (wt. %) | $K_{cat}$ | $K_{Ti}$ | I.I. (%) |
|---|---|---|---|---|---|
| Exp.-64 | methyl benzoate | 2.9 | 510 | 17,590 | 89.3 |
| Exp.-65 | methyl p-methyl benzoate | 3.1 | 597 | 19,260 | 88.5 |
| Exp.-66 | phenyl acetate | 3.5 | 475 | 13,570 | 85.3 |
| Exp.-67 | ethyl cinnamate | 4.3 | 421 | 9,790 | 87.1 |

EXAMPLES 68 TO 71

The preparation of catalytic component and the polymerization of propylene were repeated in accordance with the process of Example 54 except using various alcohols shown in Table 17 instead of ethanol in the process (I)-(B).

The results are shown in Table 17.

TABLE 17

| | Alcohol | Ti content in cat. (wt. %) | $K_{cat}$ | $K_{Ti}$ | I.I. (%) |
|---|---|---|---|---|---|
| Exp.-68 | n-butyl alcohol | 4.2 | 620 | 14,760 | 85.3 |
| Exp.-69 | n-hexyl alcohol | 3.2 | 596 | 18,630 | 85.1 |
| Exp.-70 | n-decyl alcohol | 2.9 | 683 | 23,550 | 84.2 |
| Exp.-71 | n-octyl alcohol | 2.8 | 725 | 25,890 | 86.0 |

EXAMPLE 72

(I) Preparation of titanium containing solid catalytic component

In a 500 ml four necked flask which was purged with dry nitrogen gas, 32 ml of di-n-butyl ether solution containing chloro-n-butyl magnesium at a concentration of 3.2 m mole/ml was charged and 150 ml of tetrahydrofuran solution containing 100 m mole of water was added dropwise at 25° C. during 30 minutes under stirring it and the mixture was heated to 60° C. and further stirred for 1 hour. The white precipitate of the reaction product was washed with n-heptane and dried under a reduced pressure to distill off the solvent to obtain 7.8 g of dry powder. The atomic ratio of Cl/Mg of the powder was 0.92. Then, 18 ml of n-heptane was added to 1.00 g of the powder and 6.8 m mole of ethyl benzoate and 13.6 m mole of silicon tetrachloride were added to the solution and the mixture was stirred at 60° C. for 1 hour, and then, the reaction product was washed 5 times with each 100 ml of n-heptane and the solvent was distilled off under a reduced pressure to obtain a white powder. The atomic ratio of Cl/Mg of the powder was 1.56. Then, 30 ml of titanium tetrachloride was added to the powder and the mixture was heated to 130° C. to react them for 1 hour. After the reaction, the reaction product was washed 2 times with each 100 ml of toluene and further washed 3 times with each 100 ml of n-heptane to obtain a pale yellowish green solid catalytic component having 2.8 wt. % of the titanium content.

(II) POLYMERIZATION OF OLEFIN

The polymerization of olefin was carried out by using the catalytic component prepared by the process (I).

In a 1 liter four necked flask which was purged with dry nitrogen gas, 500 ml of n-heptane, 0.15 m mole of triethyl aluminum and 26 mg of the titanium-containing solid catalytic component prepared by the process (I) were charged. The molar ratio of Al/Ti was 9.9. Then, the mixture was heated to 70° C. under stirring it and propylene gas was introduced under the atmospheric pressure to perform the polymerization for 2 hours. The polymerization was stopped by adding a small amount of i-propyl alcohol. The content was added into methanol and the precipitate was separated and dried to obtain 31.1 g of white powdery polypropylene.

The polymerization activity of the catalyst $K_{cat}$ was 998 and $K_{Ti}$ was 35,600 and the isotactic index I.I. was 80.3% and MFI was 1.8.

The result is shown in Table 18.

EXAMPLES 73 TO 78

The preparation of titanium-containing solid catalystic component was repeated in accordance with the process (I) of Example 72 except using chlorosilanes shown in Table 18. instead of silicon tetrachloride.

The polymerization of propylene was repeated in accordance with the process (II) of Example 72.

The results are shown in Table 18.

TABLE 18

| | Si compound | Ti content in cat. (wt. %) | $K_{cat}$ | $K_{Ti} \times 10^{-3}$ | I.I. |
|---|---|---|---|---|---|
| Exp.-72 | $SiCl_4$ | 2.8 | 998 | 35.6 | 80.3 |
| Exp.-73 | $(CH_3)SiCl_3$ | 3.3 | 1011 | 30.6 | 75.0 |
| Exp.-74 | $(CH_3)_2SiCl_2$ | 4.1 | 1067 | 26.0 | 73.6 |
| Exp.-75 | $(CH_3)_3SiCl$ | 2.9 | 1462 | 50.4 | 71.9 |
| Exp.-76 | $C_6H_5SiCl_3$ | 3.8 | 1235 | 32.5 | 75.0 |
| Exp.-77 | $(C_6H_5)_2SiCl_2$ | 2.8 | 963 | 34.4 | 82.3 |
| Exp.-78 | $(C_6H_5)_3SiCl$ | 2.6 | 1132 | 43.5 | 80.9 |

EXAMPLES 79 TO 81

The polymerization of propylene was repeated in accordance with the process of Example 75 except using various electron donors shown in Table 19 instead of ethyl benzoate.

The results are shown in Table 19.

TABLE 19

| | Electron donor | $K_{cat}$ | $K_{Ti} \times 10^{-3}$ | I.I.(%) |
|---|---|---|---|---|
| Exp.-79 | phenyl acetate | 977 | 36.2 | 81.0 |
| Exp.-80 | ethyl cinnamate | 865 | 26.2 | 72.8 |
| Exp.-81 | tetramethyl ethylenediamine | 932 | 32.1 | 69.1 |

EXAMPLE 82

The polymerization of olefin was carried out by using the titanium-containing solid catalytic component of Example 75.

In a 1 liter four necked flask which was purged with dry nitrogen gas, 500 ml of n-heptane, 0.27 m mole of triethyl aluminum, 0.033 m mole of ethyl benzoate and 26 mg of the titanium-containing solid catalytic component were charged.

Then, the mixture was heated to 70° C. under stirring it and propylene gas was introduced under the atmospheric pressure to perform the polymerization for 2 hours. The polymerization was stopped by adding a small amount of i-propyl alcohol. The content was added into methanol and the precipitate was separated and dried to obtai 26.8 g of white powdery polypropylene.

The polymerization activity of the catalyst, $K_{cat}$ was 859 and $K_{Ti}$ was 29,600 and the isotactic index I.I. was 93.2%.

EXAMPLE 83

In a 500 ml four necked flask which was purged with dry nitrogen gas, 32 ml of di-n-butyl ether solution containing chloro-n-butyl magnesium at a concentration of 3.2 m mole/ml was charged and cooled to $-20°$ C. and 100 m mole of ethyl benzoate was added dropwise under stirring it, and then, 160 ml of ethyl ether solution containing 100 m mole of water was added dropwise at $-20°$ C. under stirring it to form white precipitate. After the addition, the mixture was stirred at $-20°$ C. for 2 hours and then, further stirred at 45° C. for 1 hour. The supernatant liquid was decanted and the precipitate was washed with n-heptane and dried to obtain the solid. Then, 200 m mole of trimethyl chlorosilane was added and the mixture was treated at 60° C. for 1 hour under stirring it and the product was washed with n-heptane and dried. Then, 220 ml of titanium tetrachloride was added to the product and the mixture was heated at 130° C. for 1 hour and the product was washed with n-heptane to obtain the solid catalytic component having 3.56 wt.% of the titanium content.

The polymerization of propylene was repeated in accordance with the process (II) of Example 72 except using 25.0 mg of the catalytic component and 0.12 m mole of triethyl aluminum to obtain 27.8 g of white powdery polypropylene.

The polymerization activity of the catalyst, $K_{cat}$ was 927 and $K_{Ti}$ was 26,000 and the isotactic index I.I. was 73.8%.

EXAMPLE 84

In a 500 ml four necked flask which was purged with dry nitrogen gas, di-n-butyl ether solution containing 100 m moles of chloro-n-butyl magnesium was charged and ethyl ether solution contaning 100 m mole of water was added dropwise at the room temperature under stirring it. After the addition, the mixture was stirred at the room temperature for 1 hour and further stirred at 45° C. for 1 hour. The reaction mixture was washed with n-heptane and dried to obtain white powder. Then, 200 m mole of trimethyl chlorosilane was added to the powder and the mixture was stirred at 60° C. for 1 hour and the product was washed with n-heptane and dried and then, 220 ml of titanium tetrachloride was added and the mixture was heated at 130° C. for 1 hour. The product was washed with n-heptane and 20 m mole of ethyl benzoate was added and the mixture was heated at 60° C. for 1 hour and the product was washed with n-heptane to obtain a solid catalytic component having 2.2 wt. % of the titanium content.

The polymerization of propylene was repeated in accordance with the process (II) of Example 72 except using 25 mg of the resulting catalytic component and 0.08 m mole of triethyl aluminum to obtain 26.3 g of white powdery polypropylene.

The polymerization activity of the catalyst $K_{cat}$ was 877 and $K_{Ti}$ was 39800 and the isotactic index I.I. was 76.3%.

EXAMPLE 85

In a 500 ml four necked flask which was purged with dry nitrogen gas, di-n-butyl ether solution containing chloro-n-butyl magnesium at a concentration of 100 m mole was charged and ether solution containing 100 m mole of water was added dropwise at the room temperature under stirring it. After the addition, the mixture was stirred at the room temperature for 1 hour and further stirred at 45° C. for 1 hour. The reaction mixture was washed with n-heptane and dried to obtain white powder. Then, 20 m mole of ethyl benzoate was added to the powder and the mixture stirred at 100° C. for 1 hour and the product was washed with n-heptane and dried, and 200 m mole of silicon tetrachloride was added and the mixture was heated at 60° C. for 1 hour and 220 ml of titanium tetrachloride was added and the mixture was heated at 130° C. for 1 hour. The product was washed with n-heptane to obtain a solid catalytic component having 3.6 wt. % of the titanium content.

The polymerization of propylene was repeated in accordance with the process (II) of Example 72 except using 23 mg of the catalytic component and 0.11 m mole of triethyl aluminum to obtain 33.8 g of white powdery polypropylene.

The polymerization activity of the catalyst $K_{cat}$ was 1225 and $K_{Ti}$ was 34,000 and the isotactic index I.I. was 82.0%.

EXAMPLE 86

In a flask, 1.00 g of the hydrolyzed product of Grignard reagent obtained in Example 72 was admixed with 18 ml of n-heptane and 6.8 m mole of ethyl benzoate and the mixture was heated at 60° C. for 1 hour and the product was washed 5 times with each 100 ml of n-heptane. The solvent was distilled off under a reduced pressure and then, 13.6 m mole of dichlorodimethyl silane and 30 ml of titanium tetrachloride were simultaneously added and the mixture was heated at 60° C. for 1 hour. Then, the product was washed with n-heptane to obtain the solid catalytic component having 2.4 wt. % of the titanium content.

The polymerization of propylene was repeated in accordance with the process (II) of Example 72 except using 25 mg of the catalytic component and 0.090 m mole of triethyl aluminum to obtain 28.5 g of white powdery polypropylene.

The polymerization activity of the catalyst $K_{cat}$ was 950 and $K_{Ti}$ was 39,600 and the isotactic index I.I. was 76.8%.

EXAMPLE 87

(I) Preparation of titanium-containing solid catalytic component

In a 500 ml four necked flask which was purged with dry nitrogen gas, 40 ml of di-n-butyl ether solution containing chloro-n-butyl magnesium at a concentration of 2.5 m mole/ml was charged and 150 ml of tetrahydrofuran solution containing 100 m mole of water was added dropwise at 25° C. under vigorously stirring it to form white precipitate. After the addition, the mixture was stirred at 50° C. for 1 hour and then, the solvent was distilled off under a reduced pressure to obtain 7.9 g of white solid powder. The atomic ratio of Cl/Mg of the powder was 0.98. Then, 4 m mole of ethyl benzoate, 20 ml of n-heptane, 40 m mole of thionyl chloride were added to 1.54 g of the powder and the mixture was heated at 60° C. for 2 hours and washed 5 times with each 100 ml of n-heptane and the solvent was distilled off to obtain white powder. The atomic ratio of Cl/Mg of the powder was 1.75. Then, 20 ml of titanium tetrachloride was added and the mixture was heated at 130° C. for 1 hour and washed 7 times with each 100 ml of n-heptane to obtain a titanium-containing solid catalytic component having 3.0 wt. % of the titanium content.

(II) Polymerization of olefin

The polymerization of olefin was carried out by using the catalytic component prepared by the process (I).

In a 1 liter four necked flask which was purged with dry nitrogen gas, 500 ml of n-heptane, 0.12 m mole of triethyl aluminum, and 35.0 mg of the titanium-containing solid catalyst prepared by the process of (I) were charged. The molar raio of Al/Ti was 5.5.

Then, the mixture was heated to 70° C. under stirring it and propylene gas was introduced under the atmospheric pressure to perform the polymerization for 2 hours. The polymerization was stopped by adding a small amount of i-propyl alcohol. The content was added into methanol and the precipitate was separated and dried to obtain 25.0 g of white powdery polypropylene.

The polymerization activity of the catalyst, $K_{cat}$ was 595 and $K_{Ti}$ was 19,830 and the isotactic index I.I. was 85.6% and MFI was 1.6.

EXAMPLE 88

The preparation of titanium-containing solid catalytic component was repeated in accordance with the process (I) of Example 87 except using phosphorus trichloride instead of thionyl chloride. The atomic ratio of Cl/Mg after the halogenation was 1.65, and the titanium content was 3.7 wt. %.

The polymerization of propylene was repeated in accordance with the process (II) of Example 87 except using the catalytic component.

The polymerization activity of the catalyst $K_{cat}$ was 415 and $K_{Ti}$ was 11,200 and the isotactic index I.I. was 78.2%.

EXAMPLE 89

20 ml of n-heptane and 4 m mole of ethyl benzoate were added to 1.54 g of the hydrolyzed product of the Grignard reagent obtained by the process of Example 87 and hydrogenchloride gas was introduced into the liquid phase at a rate of 10 liter/hour for 2 hours under stirring. The temperature was kept at 25° C. The supernatant was decanted and the precipitate was washed with n-heptane and dried to obtain a solid having the atomic ratio of Cl/Mg of 1.56. Then, 20 ml of titanium tetrachloride was added to it and the mixture was heated at 130° C. for 1 hour and washed with n-heptane to obtain the solid catalytic component having 4.1 wt. % of the titanium content.

The polymerization of propylene was repeated in accordance with the process (II) of Example 87 except using 40.0 mg of the catalytic component and 0.24 m mole of triethyl aluminum to obtain 24.5 g of white powdery polypropylene.

The polymerization activity of the catalyst $K_{cat}$ was 510 and $K_{Ti}$ was 12,400 and the isotactic index I.I. was 84.5%.

EXAMPLE 90

The preparation of titanium-containing solid catalytic component and the polymerization of propylene were repeated in accordance with the process of Example 87 except using 20 ml of carbon tetrachloride instead of thionyl chloride without using 20 ml of n-heptane and heating the mixture at the boiling point of carbon tetrachloride for 2 hours in the process (II).

The polymerization activity of the catalyst $K_{cat}$ was 410 and $K_{Ti}$ was 10,300 and the isotactic index I.I. was 71.5%. The results are shown in Table 20.

EXAMPLES 91 TO 94

The preparation of titanium-containing solid catalytic component and the polymerization of propylene were repeated in accordance with the process of Example 90 except using various halogenation agents shown in Table 20 instead of carbon tetrachloride.

The results are shown in Table 20.

TABLE 20

| | Halogenation agent | Atomic ratio of Cl/Mg | Ti content in cat. (wt. %) | $K_{cat}$ | $K_{Ti} \times 10^{-3}$ | I.I. |
|---|---|---|---|---|---|---|
| Exp.-90 | $CCl_4$ | 1.52 | 4.0 | 410 | 10.3 | 71.5 |
| Exp.-91 | $CHCl_3$ | 1.40 | 3.6 | 400 | 11.1 | 73.3 |
| Exp.-92 | $CH_2Cl_3$ | 1.30 | 4.4 | 460 | 10.5 | 70.2 |
| Exp.-93 | $CH_3(CH_2)_3Cl$ | 1.32 | 4.8 | 380 | 7.9 | 75.0 |
| Exp.-94 | $CH_3(CH_2)_7Cl$ | 1.10 | 5.5 | 365 | 6.6 | 77.1 |

EXAMPLES 95 TO 97

The polymerization of propylene was repeated in accordance with the process of Example 87 except using various electon donors shown in Table 21 instead of ethyl benzoate.

The results are shown in Table 21.

TABLE 21

| | Electron donor | $K_{cat}$ | $K_{Ti} \times 10^{-3}$ | I.I. |
|---|---|---|---|---|
| Exp.-95 | phenyl acetate | 580 | 18.7 | 84.5 |
| Exp.-96 | ethyl cinnamate | 590 | 17.9 | 88.5 |
| Exp.-97 | tetramethyl ethylene diamine | 310 | 6.9 | 82.2 |

EXAMPLE 98

The polymerization of propylene was carried out by using the titanium containing solid component obtained in Example 87 as follows.

In a 1 liter four necked flask which was purged with dry nitrogen gas, 500 ml of n-heptane, 0.263 m mole of triethyl aluminum, 0.033 m mole of ethyl benzoate and 35.0 mg of the catalytic component were charged.

Then, the mixture was heated at 70° C. under stirring it and propylene gas was introduced under the atmospheric pressure to perform the polymerization for 2 hours. The polymerization was stopped by adding a small amount of i-propyl alcohol. The content was added into methanol and the precipitate was separated and dried to obtain 12.0 g of white powdery polypropylene.

The polymerization activity of the catalyst $K_{cat}$ was 285 and $K_{Ti}$ was 9,500 and the isotactic index I.I. was 93.5%.

EXAMPLE 99

In a 500 ml four necked flask which was purged with dry nitrogen gas, 32 ml of di-n-butyl ether solution containing chloro-n-butyl magnesium at a concentration of 3.2 m mole/ml was charged and cooled to −20° C. and 20 m mole of ethyl benzoate was added dropwise under stirring it. Then, 160 ml of ethyl ether solution containing 100 m mole of water was added dropwise at −20° C. to precipitate white precipitate. After the addition, the mixture was stirred at −20° C. for 2 hours and then, further stirred at 45° C. for 1 hour. The supernatant was decanted and the precipitate was washed with n-heptane and dried to obtain the solid. Then, 200 m mole of thionyl chloride and 100 ml of n-heptane were added and the mixture was heated at 60° C. for 1 hour under stirring it, and washed with n-heptane and dried. Then, 220 ml of titanium tetrachloride was added and the mixture was heated at 130° C. for 1 hour and washed with n-heptane to obtain the solid catalytic component having 3.3 wt. % of the titanium content.

The polymerization of propylene was repeated in accordance with the process (II) of Example 87 except using 30.0 mg of the resulting catalytic component and 0.14 m mole of triethyl aluminum to obtain 18.5 g of white powdery polypropylene.

The polymerization activity of the catalyst, $K_{cat}$ was 514 and $K_{Ti}$ was 15,600 and the isotactic index I.I. was 75.0%.

EXAMPLE 100

In a 500 ml four necked flask which was purged with dry nitrogen gas, di-n-butyl ether solution containing 100 m mole of chloro-n-butyl magnesium was charged and ethyl ether solution containing 100 m mole of water was added dropwise at the room temperature under stirring it. After the addition, the mixture was stirred at the room temperature for 1 hour and further stirred at 45° C. for 1 hour. The reaction mixture was washed with n-heptane and dried to obtain white powder.

Then, 200 m mole of thionyl chloride was added and the mixture was stirred at 60° C. for 1 hour and washed with n-heptane and dried and 220 ml of titanium tetrachloride was added and the mixture was stirred at 130° C. for 1 hour and washed with n-heptane. Then, 20 m mole of ethyl benzoate was added and the mixture was heated at 60° C. for 1 hour and washed with n-heptane to obtain a solid catalytic component having 2.2 wt. % of the titanium content.

The polymerization of propylene was repeated in accordance with the process (II) of Example 87 except using 25 mg of the catalytic component and 0.08 m mole of triethyl aluminum to obtain 10.7 g of white powder polypropylene.

The polymerization activity of the catalyst, $K_{cat}$ was 357 and $K_{Ti}$ was 16,200 and the isotactic index I.I. was 84.6%.

EXAMPLE 101

In a 500 ml four necked flask which was purged with dry nitrogen gas, di-n-butyl ether solution containing 100 m mole of chloro-n-butyl magnesium was charged and ethyl ether solution containing 100 m mole of water was added dropwise at the room temperature under stirring it. After the addition, the mixture was stirred at the room temperature for 1 hour and further stirred at 45° C. for 1 hour. The reaction product was washed with n-heptane and dried to obtain white powder.

Then, 20 m mole of ethyl benzoate was added and the mixture was stirred at 100° C. for 1 hour and washed with n-heptane and dried. Then, 80 m mole of thionyl chloride was added and the mixture was heated at 60° C. for 1 hour and further 220 ml of titanium tetrachloride was added and the mixture was treated at 130° C. for 1 hour and washed with n-heptane to obtain the solid catalytic component having 4.2 wt. % of the titanium content.

The polymerization of propylene was repeated in accordance with the process (II) of Example 87 except using 33.0 mg of the resulting catalytic component and 0.15 m mole of triethyl aluminum to obtain 18.3 g of white powdery polypropylene.

The polymerization activity $K_{cat}$ was 463 and $K_{Ti}$ was 11,000 and the isotactic index I.I. was 82.0%.

EXAMPLE 102

(I) Preparation of titanium containing solid catalytic component

In a 500 ml four necked flask which was purged with dry nitrogen gas, 150 ml of toluene and 40 ml of di-n-butyl ether solution containing di-n-butyl magnesium at a concentration of 2.5 m mole/ml was charged and 5.8 ml (100 m mole) of ethanol was added dropwise at 25° C. under vigorously stirring it. The molar ratio of $C_2H_5OH/n\text{-BuMgCl}$ was 1.0. After the addition, the mixture was stirred at 25° C. for 1 hour and further stirred at 80° C. for 1 hour. The reaction product was washed 5 times with each 150 ml of n-heptane and the heptane was distilled off under a reduced pressure and the product was dried to obtain white powder. The fomula of the powder was $(C_2H_5O)_{0.98}MgCl_{0.93}$.

Then, 150 ml of toluene, 2.9 ml (20 m mole) of ethyl benzoate and 200 m mole of thionyl chloride were added to the powder at 25° C. After the addition, the mixture was heated to 60° C. and stirred at 60° C. for 2 hours. Toluene was distilled off under a reduced pressure and the product was dried to obtain white powder having the atomic ratio of Cl/Mg of 1.4.

Then, 220 ml (2 mole) of titanium tetrachloride was added at 25° C. under stirring it. The molar ratio of $TiCl_4/Mg$ was 20. After the addition, the mixture was heated at 130° C. and stirred at 130° C. for 1 hour and then, the product was repeatedly washed with n-heptane until disappearing symptom of chlorine to obtain pale yellowish titanium-containing solid catalytic component having 2.8 wt. % of the titanium content.

(II) Polymerization of olefin

The polymerization of olefin was carried out by using the catalytic component prepared by the process (I).

In a 1 liter four necked flask which was purged with dry nitrogen gas, 500 ml of n-heptane, 0.20 m mole of triethyl aluminum and 50 mg of titanium-containing solid catalytic component prepared by the process (I) were charged. The molar ratio of Al/Ti was 7. Then, the mixture was heated to 70° C. under stirring it, and propylene gas was introduced under the atmospheric pressure to perform the polymerization for 2 hours. The polymerization was stopped by adding a small amount of i-propyl alcohol. The content was added into methanol and the precipitate was separated and dried to obtain 31.2 g of white powdery polypropylene.

The polymerization activity of the catalyst $K_{cat}$ was 520 and $K_{Ti}$ was 18,570 and the isotactic index I.I. was 88.2% and MFI was 2.8.

EXAMPLES 103 TO 107

The preparation of titanium-containing solid catalytic component was repeated in accordance with the process (I) of Example 102 except using the halogenation agents shown in Table 22 instead of thionyl chloride.

The polymerization of propylene was repeated in accordance with the process (II) of Example 102.

The results are shown in Table 22.

TABLE 22

| | Halogenation agent | Ti content in cat.(wt. %) | $k_{cat}$ | $K_{Ti}$ | I.I. (%) |
|---|---|---|---|---|---|
| Exp.-103 | $PCl_3$ | 2.5 | 509 | 20360 | 88.9 |
| Exp.-104 | HCl | 2.3 | 480 | 20870 | 91.3 |
| Exp.-105 | $CCl_4$ | 3.1 | 510 | 16450 | 90.8 |
| Exp.-106 | $CHCl_3$ | 3.1 | 565 | 18230 | 88.8 |
| Exp.-107 | $CH_2Cl_2$ | 3.5 | 463 | 13230 | 87.1 |

EXAMPLE 108

(I) Preparation of titanium containing solid catalytic component

In a 500 ml four necked flask which was purged with nitrogen gas, 150 ml of toluene and 40 ml of di-n-butyl ether solution containing chloro-n-butyl magnesium at a concentration of 2.5 m mole/ml, was charged and 5.8 ml (100 m mole) of ethanol was added dropwise to the solution at 25° C. under stirring it. The molar ratio of $C_2H_5OH/n\text{-BuMgCl}$ was 1.0. The temperature was raised to 80° C. and the mixture was stirred at 80° C. for 1 hour and the reaction product was washed with n-heptane and the solvent was distilled off under a reduced pressure to obtain dry white powder. The atomic ratio of Cl/Mg of the powder was 0.93. Then, 150 ml of toluene, 2.9 ml (20 m mole) of ethyl benzoate and 200 m mole of silicon tetrachloride were added to the powder and the mixture was heated at 60° C. for 2 hours and the product was washed 5 times with each 100 ml of n-heptane and the solvent was distilled off under a reduced pressure. The atomic ratio of Cl/Mg of the resulting white powder was 1.5. Then, 220 ml (2 mole) of titanium tetrachloride was added and the mixture was heated to 130° C. to react them for 1 hour. Then, the product was washed 5 times with each 100 ml of n-heptane to obtain pale yellowish green solid having 2.8 wt. % of the titanium content.

(II) Polymerization of olefin

The polymerization of propylene was repeated in accordance with the process (II) of Example 102 except using the catalytic component to obtain 40.8 g of white powdery polypropylene.

The polymerization activity of the catalyst $K_{cat}$ was 680 and $K_{Ti}$ was 24,290 and the isotactic index I.I. was 88.5% and MFI was 3.7.

EXAMPLES 109 TO 112

The preparation of titanium-containing solid catalytic component was repeated in accordance with the process (I) of Example 108 except using the halogenation agents shown in Table 23 instead of silicon tetrachloride.

The polymerization of propylene was repeated in accordance with the process (II) of Example 102.

The results are shown in Table 23.

TABLE 23

| | Halogenation agent | Ti content in cat.(wt. %) | $K_{cat}$ | $K_{Ti}$ | I.I. (%) |
|---|---|---|---|---|---|
| Exp.-109 | $CH_3SiCl_3$ | 3.1 | 801 | 25,840 | 85.1 |
| Exp.-110 | $(CH_3)_2SiCl_2$ | 2.9 | 705 | 24,310 | 86.5 |
| Exp.-111 | $(CH)_3SiCl$ | 2.8 | 620 | 22,140 | 89.5 |
| Exp.-112 | $(C_6H_5)SiCl_3$ | 3.5 | 631 | 18,030 | 88.3 |

EXAMPLES 113 TO 116

The preparation of titanium-containing solid catalytic component was repeated in accordance with the process (I) of Example 108 except using the electron donors shown in Table 24 instead of ethyl benzoate.

The polymerization of propylene was repeated in accordance with the process (II) of Example 102.

The results are shown in Table 24.

TABLE 24

| | Electron donor | Ti content in cat.(wt. %) | $K_{cat}$ | $K_{Ti}$ | I.I. (%) |
|---|---|---|---|---|---|
| Exp.-113 | methyl p-methyl benzoate | 2.5 | 683 | 27,320 | 89.1 |
| Exp.-114 | phenyl acetate | 2.7 | 615 | 22,780 | 87.1 |
| Exp.-115 | tetramethyl ethylenediamine | 4.5 | 487 | 10,820 | 85.3 |
| Exp.-116 | ethyl cinnamate | 2.8 | 530 | 18,930 | 90.1 |

EXAMPLES 117 TO 119

The preparation of titanium-containing solid catalytic component was repeated in accordance with the process (I) of Example 108 except using the alcohols shown in Table 25.

The polymerization of propylene was repeated in accordance with the process (II) of Example 102.

The results are shown in Table 25.

TABLE 25

| | Alcohol | Ti content in cat.(wt. %) | $K_{cat}$ | $K_{Ti}$ | I.I. (%) |
|---|---|---|---|---|---|
| Exp.-117 | n-butanol | 2.3 | 580 | 25,220 | 90.3 |
| Exp.-118 | n-hexanol | 2.1 | 485 | 23,100 | 91.5 |
| Exp.-119 | n-decanol | 3.1 | 610 | 19,680 | 90.1 |

EXAMPLE 120

The polymerization of propylene was carried out by using the titanium-containing solid catalytic component obtained by the process (I) of Example 108 as follows.

In a 1 liter four necked flask which was purged with dry nitrogen gas, 500 ml of n-heptane, 0.322 m mole of triethyl aluminum, 0.058 m mole of methyl p-methylbenzoate and 50 mg of the titanium-containing solid catalytic component were charged. Then, the mixture was heated to 70° C. under stirring it and propylene gas was introduced under the atmospheric pressure to perform the polymerization for 2 hours. The polymerization was stopped by adding a small amount of i-propyl alcohol. The content was added into methanol and the precipitate was separated and dried to obtain 24.9 g of white powdery polypropylene. The polymerization activity of the catalyst, $K_{cat}$ was 415, $K_{Ti}$ was 14,820 and I.I. was 94.0%.

EXAMPLE 121

In a 500 ml four necked flask which was purged with dry nitrogen g is, 32 ml of di-n-butyl ether solution containing chloro-n-butyl magnesium at a concentration of 3.2 m mole/ml, was charged and 20 m mole of methyl p-methyl benzoate was added dropwise to the solution at −20° C. under stirring it and then, 100 m mole of ethanol was added dropwise at −20° C. to the mixture under stirring it to obtain white precipitate. After the addition, the mixture was stirred at −20° C. for 2 hours and further stirred at 45° C. for 1 hour. The supernatant was decanted and the precipitate was washed with n-heptane and dried it to obtain a solid. Then, 200 m mole of thionyl chloride, and 100 m of n-heptane were added to the solid and the mixture was heated at 60° C. for 2 hours under stirring it and the product was washed with n-heptane and dried. Then, 220 ml of titanium tetrachloride was added to the resulting solid and the mixture was heated at 130° C. for 1 hour and the product was washed with n-heptane to obtain a solid catalytic component having 3.4 wt. % of the titanium content.

The polymerization of propylene was repeated in accordance with the process (II) of Example 102 except using 50 mg of the resulting catalytic component and 0.28 m mole of triethyl aluminum to obtain 30.3 g of white powdery polypropylene.

The polymerization activity of the catalyst, $K_{cat}$ was 505 and $K_{Ti}$ was 14,850 and the isotactic index I.I. was 89.3%.

EXAMPLE 122

In a 500 ml four necked flask which was purged with dry nitrogen gas, di-n-butyl ether solution containing 100 m mole of chloro-n-butyl magnesium was charged and 100 m mole of ethanol was added dropwise at the room temperature under stirring it. After the addition, the mixture was stirred at the room temperature for 1 hour and further stirred at 45° C. for 1 hour and the reaction product was washed with n-heptane and dried to obtain white powder. Then, 200 m mole of silicon tetrachloride was added and the mixture was stirred at 60° C. for 1 hour and the product was washed with n-heptane and dried. Then, 220 ml of titanium tetrachloride was added and the mixture was heated at 130° C. for 1 hour and the product was washed with n-heptane and 20 m mole of ethyl benzoate was added and the reaction mixture was heated at 60° C. for 1 hour and the product was washed with n-heptane to obtain a solid catalytic component having 3.3 wt. % of the titanium component.

The polymerization of propylene was repeated in accordance with the process (II) of Example 102 except using 50 mg of the catalytic component and 0.28 m mole of triethyl aluminum to obtain 24.8 g of white powdery polypropylene.

The polymerization activity of the catalyst $K_{cat}$ was 413 and $K_{Ti}$ was 12,530 and the isotactic index I.I. was 87.3%.

EXAMPLE 123

In a 500 ml four necked flask which was purged with dry nitrogen gas, di-n-butyl ether solution containing 100 m mole of chloro-n-butyl magnesium was charged and 100 m mole of butanol was added dropwise at the room temperature. After the addition, the mixture was stirred at the room temperature for 1 hour and stirred at 45° C. for 1 hour. The product was washed with n-heptane and dried to obtain white powder. Then, 20 m mole of ethyl benzoate was added to the solid and the mixture was stirred at 90° C. for 1 hour and then, 80 m mole of thionyl chloride was added and the mixture was heated at 60° C. for 1 hour and then, 220 ml of titanium tetrachloride was added and the mixture was heated at 130° C. for 1 hour and the product was washed with n-heptane to obtain a solid catalytic component having 3.0 wt. % of the titanium content.

The polymerization of propylene repeated in accordance with the process (II) of Example 102 except using 55 mg of the catalytic component and 0.25 m mole of triethyl aluminum to obtain 29.2 g of white powdery polypropylene.

The polymerization activity of the catalyst $K_{cat}$ was 486 and $K_{Ti}$ was 16,220 and the isotactic index I.I. was 85.1%.

EXAMPLE 124

(I) Preparation of titanium-containing solid catalytic component

In a 500 ml four necked flask which was purged with dry nitrogen gas, 32 ml of di-n-butyl ether solution containing chloro-n-butyl magnesium at a concentration of 3.2 m mole/ml was charged and 150 ml of tetrahydrofuran solution containing 100 m mole of water was added dropwise at 25° C. under stirring it and the mixture was heated to 60° C. and stirred at 60° C. for 1 hour. The resulting white precipitate was washed with n-heptane and the solvent waas distilled off under a reduced pressure to obtain 7.8 g of dry powder. The atomic ratio of Cl/Mg of the powder was 0.92. Then, 6.8 m mole of ethyl benzoate and 13,6 m mole of silicon tetrachloride were added to 18 ml of n-heptane solution containing 1.00 g of the powder, and the mixture was heated at 60° C. for 1 hour and then, the product was washed 5 times with each 100 ml of n-heptane and the solvent was distilled off under a reduced pressure to obtain white powder having the atomic ratio of Cl/Mg of 1.56. Then, 30 ml of titanium tetrachloride was added and the mixture was heated at 130° C. to react them for 1 hour, and then, the product was washed 2 times with each 100 ml of toluene and further washed 3 times with each 100 ml of n-heptane to obtain pale yellowish green solid having 2.8 wt. % of the titanium content.

(II) Polymerization of olefin

The polymerization of propylene was carried out by using the catalytic component obtained by the process (I) as follows.

In a 500 ml four necked flask which was purged with dry nitrogen gas, 300 ml of n-heptane, 0.19 m mole of triethyl aluminum and 0.03 m mole of methyl p-tolylate and 30.1 mg of the titanium-containing solid catalytic component prepared by the process (I) were charged.

Then, the mixture was heated to 70° C. under stirring it and propylene gas was introduced under the atmospheric pressure to perform the polymerization for 2 hours. The polymerization was stopped by adding a small amount of methanol. The content was added into methanol and the precipitate was separated and dried to obtain white powdery polypropylene.

The polymerization activity of the catalyst $K_{cat}$ was 392 and $K_{Ti}$ was 14,000 and the isotactic index I.I. of 95.8%.

EXAMPLE 125

(I) Preparation of titanium-containing solid catalytic component

In a 500 ml four necked flask which was purged with dry nitrogen gas, 150 ml of toluene and 40 ml of di-n-butyl ether solution containing chloro-n-butyl magnesium at a concentration of 2.5 m mole/ml, were charged and 5.8 ml of ethanol was added dropwise to the solution at 25° C. under vigorously stirring. The molar ratio of $C_2H_5OH$ to n-BuMgCl was 1.0. After the addition, the mixture was stirred at 25° C. for 1 hour and the temperature was raised to 80° C. and the mixture was further stirred for 1 hour. The reaction product was washed 5 times with each 150 m of heptane and the reaction mixture was dried under a reduced pressure by distilling off n-heptane to obtain white solid powder which was $(C_2H_5O)_{0.98}MgCl_{0.93}$.

Then, 150 ml of toluene and 2.9 m (20 m mole) of ethyl benzoate was added at 25° C. The molar ratio of ethyl benzoate to Mg was 0.2. After the addition, the mixture was heated at 110° C. and stirred for 1 hour. Then, toluene was distilled off from the reaction mixture under a reduced pressure to obtain white solid powder. Then, 220 m (2 mole) of titanium tetrachloride was added at 25° C. under stirring. The molar ratio of $TiCl_4/Mg$ was 20. After the addition, the mixture was heated at 130° C. and stirred at 130° C. for 1 hour and the supernatant of the suspension was decanted under the hot condition, and the product was repeatedly washed with n-heptane until disappearing the symptom of chlorine in the washing solution to obtain a pale yellow solid catalytic component having 2.4 wt.% of the titanium content.

(II) Polymerization of olefin

The polymerization of propylene was repeated in accordance with the process (II) of Example 124 except using the solid catalytic component obtained by the process (I).

The polymerization activity of the catalyst $K_{cat}$ was 250 and $K_{Ti}$ was 10,400 and the isotactic index I.I. of 92.4%.

What is claimed is:

1. A process for preparing polyolefins by polymerizing an α-olefin or a mixture of α-olefin in the presence of a catalyst system prepared by combining:
   (i) an aluminum-free, titanium-containing, solid catalytic component prepared by contacting an ether suspension of amorphous magnesium hydroxyhalide prepared by reacting (a) water with (b) a Grignard reagent having the formula R'MgX wherein R' is a hydrocarbon moiety and X is a halogen atom at a temperature of from 20° to 200° C. and (d) a carboxylic ester with (c) titanium tetrachloride at a temperature of from 60° to 200° C.; with
   (ii) an organoaluminum compound.

2. The process of claim 1 wherein the α-olefin is propylene.

3. The process of claim 1 wherein the α-olefin is a mixture of propylene and another α-olefin.

4. The process of claim 1 wherein the product of (a) and (b) is a compound having the formula $Mg(OR^8)X.nE$ 

wherein $R^8$ represents hydrogen; X represents a halogen atom; E represents an ether and n represents 0.4 to 25.

5. The process of claim 1 wherein the titanium-containing solid catalytic component is prepared by adding the component (c) to a product obtained by contacting the component (a) with the component (b) in the presence of the component (d).

6. The process of claim 1 wherein the product of (a) and (b) is a compound having the formula $Mg(OR^8)X.nE$ 

wherein $R^8$ represents hydrogen atom; X represents a halogen atom; E represents an ether; and n represents 0.4 to 25.

7. The process of claim 1 wherein the titanium-containing solid catalytic component is prepared by adding the component (d) to a product obtained by contacting the component (a) with the component (d) and then, adding the component (c) to the mixture.

* * * * *